(12) United States Patent
Ohtsuka et al.

(10) Patent No.: US 8,941,849 B2
(45) Date of Patent: *Jan. 27, 2015

(54) SHEET POSITIONING DEVICE, SHEET HOLDING RECEPTACLE INCORPORATING SAME, AND IMAGE FORMING APPARATUS INCORPORATING SAME

(71) Applicants: Rie Ohtsuka, Tokyo (JP); Satoshi Araaki, Tokyo (JP); Jumpei Aoyama, Kanagawa (JP); Yosuke Eguchi, Tokyo (JP)

(72) Inventors: Rie Ohtsuka, Tokyo (JP); Satoshi Araaki, Tokyo (JP); Jumpei Aoyama, Kanagawa (JP); Yosuke Eguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,949

(22) Filed: Mar. 5, 2013

(65) Prior Publication Data

US 2013/0250328 A1 Sep. 26, 2013

(30) Foreign Application Priority Data

Mar. 22, 2012 (JP) .................. 2012-065562

(51) Int. Cl.
*G06F 3/12* (2006.01)
*H04N 1/00* (2006.01)
(Continued)

(52) U.S. Cl.
CPC ........... *H04N 1/0066* (2013.01); *B65H 83/025* (2013.01); *B65H 85/00* (2013.01); *B65H 7/02* (2013.01); *B65H 9/101* (2013.01); *G03G 15/6544* (2013.01); *H04N 2201/0093* (2013.01); *H04N 2201/0094* (2013.01); *H04N 2201/0091* (2013.01); *H04N 2201/0082* (2013.01); *B65H 2301/33312* (2013.01); *B65H 2301/4213* (2013.01); *B65H 2301/4222* (2013.01);
(Continued)

(58) Field of Classification Search
USPC ................ 358/1.12, 498; 271/171, 9.09, 162; 399/392, 370
See application file for complete search history.

(56) References Cited

U.S. PATENT DOCUMENTS 8,684,350 B2 * 4/2014 Sagawa et al. ................ 271/171
2007/0063425 A1 * 3/2007 Tsujinishi ..................... 271/145
(Continued)

FOREIGN PATENT DOCUMENTS

JP 2001-171893 6/2001
JP 2002-265130 9/2002
(Continued)

*Primary Examiner* — Jacky X Zheng
(74) *Attorney, Agent, or Firm* — Harness, Dickey & Pierce P.L.C.

(57) ABSTRACT

A sheet positioning device includes a sheet setting plate, first and second regulating members disposed facing each other to move in an orthogonal direction to a sheet conveyance direction to regulate positions of two facing ends of the sheet on the plate by contacting these ends, a driving mechanism to move the first regulating member in the orthogonal direction, first and second contact detectors mounted on the first and second regulating members to detect contact of the two facing ends, and a controller to stop the driving mechanism based on detection results obtained by the first and second contact detectors. The first and second regulating members are used to adjust a position of the sheet to a predetermined position. Respective contact surfaces of the first and second contact detectors with the sheet extend over an entire maximum loadable range in a sheet setting direction on the plate.

7 Claims, 16 Drawing Sheets

(51) Int. Cl.
  *B65H 83/02* (2006.01)
  *B65H 85/00* (2006.01)
  *B65H 7/02* (2006.01)
  *B65H 9/10* (2006.01)
  *G03G 15/00* (2006.01)
(52) U.S. Cl.
  CPC ....... *B65H2403/411* (2013.01); *B65H 2511/20* (2013.01); *B65H 2511/22* (2013.01); *B65H 2515/34* (2013.01); *B65H 2553/81* (2013.01); *B65H 2701/1315* (2013.01); *B65H 2801/06* (2013.01); *G03G 15/6502* (2013.01); *G03G 2215/00675* (2013.01)
  USPC ......... 358/1.13; 358/1.12; 358/498; 271/171; 271/9.09; 271/162; 399/392; 399/370

(56) References Cited

U.S. PATENT DOCUMENTS

| 2011/0163496 | A1  | 7/2011 | Aoyama et al. |
| 2011/0175282 | A1* | 7/2011 | Sagawa et al. ........... 271/258.01 |

FOREIGN PATENT DOCUMENTS

| JP | 2011-157214 | 8/2011 |
| JP | 2011-162353 | 8/2011 |

* cited by examiner

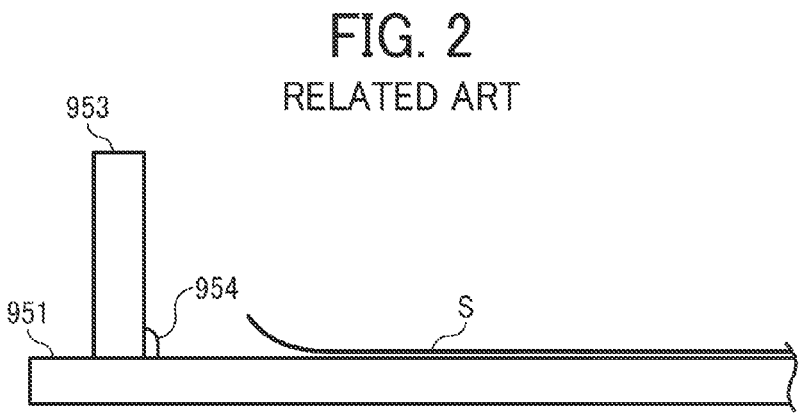
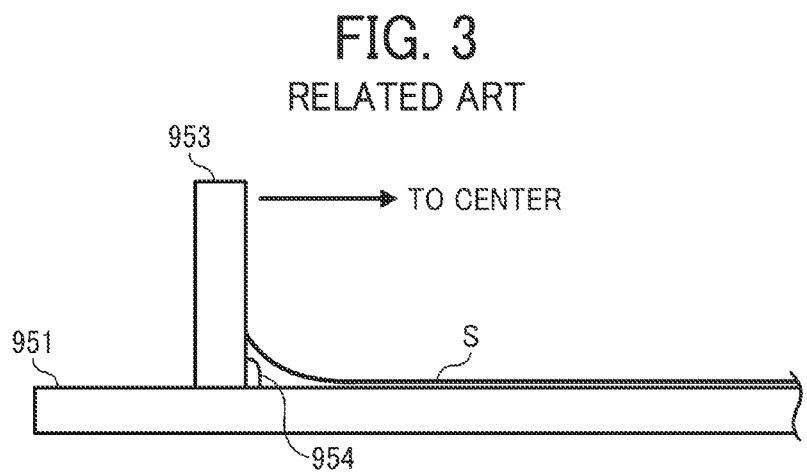
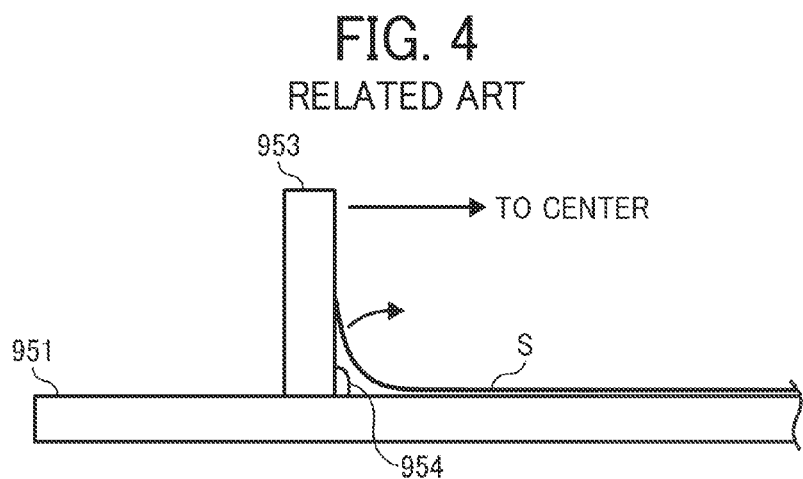

SHEET POSITIONING DEVICE, SHEET HOLDING RECEPTACLE INCORPORATING SAME, AND IMAGE FORMING APPARATUS INCORPORATING SAME

CROSS-REFERENCE TO RELATED APPLICATION

This patent application is based on and claims priority pursuant to 35 U.S.C. §119 to Japanese Patent Application No. 2012-065562, filed on Mar. 22, 2012, in the Japan Patent Office, the entire disclosure of which is hereby incorporated by reference herein.

BACKGROUND OF THE INVENTION

1. Field of the Invention

Embodiments of the present invention relate to a sheet positioning device to adjust the position of a sheet member or a recording sheet placed on a sheet setting plate at a predetermined position, a sheet holding receptacle incorporating the sheet positioning device, an image forming apparatus incorporating the sheet positioning device, and an image reading device incorporating the sheet positioning device.

2. Description of the Related Art

Known sheet positioning devices adjust a recording sheet placed on a sheet setting plate to a predetermined position in a direction orthogonal to a direction in which the recording sheet is fed to and from the sheet setting plate. Two side fences serving as regulating members are mounted on the sheet setting plate to slide in the orthogonal direction of the sheet setting plate. A sheet contact detector is mounted on each of the side fences to detect contact of the side fence with the recording sheet.

These side fences are located at respective home positions separate from each other in a widthwise direction across a gap having a width greater than the width of a recording sheet. When setting the recording sheet on the sheet setting plate, a driving unit drives to move the side fences to the home positions. While the side fences stay at the home positions, an operator places the recording sheet on the sheet setting plate and issues instructions to slide the side fences toward the center portion in the widthwise direction of the sheet setting plate. When one of the two side fences, e.g., a first side fence, reaches a contact position at which the first side fence contacts the side edge of the recording sheet, the recording sheet contacts the sheet contact detector of the first side fence. With this action, the sheet contact detector detects the contact of the first side fence with the recording sheet. However, the other side fence, e.g., a second side fence, has not yet reached its contact position with the recording sheet.

As the driving of the two side fences continues, the first side fence in contact with the recording sheet slides toward the second side fence while pressing the recording sheet. Thereafter, when the recording sheet that is pressed by the first side fence reaches a contact position at which the second side fence contacts the other side edge of the recording sheet, the recording sheet contacts the sheet contact detector of the second side fence, thereby detecting the contact of the recording sheet with the second side fence. After the contact of the recording sheet with the two side fences has been thus detected, the driving unit stops to stop movement of the side fences. At this time, the recording sheet on the sheet setting plate is aligned at the center of the sheet setting plate in the orthogonal direction.

Japanese Patent Application Publication No. 2001/171893 (JP-2001-171893-A) discloses a sheet positioning device included in an image forming apparatus that aligns the position of a recording sheet by slidably moving two side fences. FIG. 1 is an enlarged perspective view illustrating a part of the sheet positioning device. The sheet positioning device feeds a recording sheet placed on a sheet setting plate 951 in a direction indicated "x" in FIG. 1. Even though FIG. 1 shows only the first side fence 953 of the two side fences, a second side fence is also mounted on the sheet positioning device. As a driving unit drives, while holding a movable switch 954 that serves as a sheet contact detector, the first side fence 953 starts to slide in an orthogonal direction that is a direction perpendicular to a sheet conveying direction indicated "y" in FIG. 1. With the sliding of the first side fence 953, the second side fence also slides toward the first side fence 953. The second side fence holds a movable switch having the same function as that of the first side fence 953. After the two side fences have reached a position at which the recording sheet presses the respective movable switches, the driving unit stops the sliding of the side fences to align the recording sheet at the center of the sheet setting plate 951 in the orthogonal direction or the "y" direction.

However, the sheet positioning device cannot stop the side fences at appropriate positions if one or both edges of the recording sheet in the orthogonal direction are curled.

Specifically, one edge of a recording sheet S in the orthogonal direction may be curled upward, as shown in an example illustrated in FIG. 2. With the curled end, the recording sheet S cannot contact a movable switch 954 when the side fence 953 slides to the contact position with the recording sheet S, but contacts an upper portion of the side fence located above the movable switch 954. At this time, even if the second side fence correctly contacts the recording sheet S as shown in FIG. 3, the contact of the first side fence with the recording sheet S cannot be detected, which causes the driving unit to continue to move the side fences. If the side fences move further, the edge of the recording sheet S does not contact the movable switch 954 and the recording sheet S warps, as illustrated in FIG. 4. Accordingly, the movement of the side fences continues further without detecting the contact of the recording sheet S with the first side fence 953 until they reach the limits of their movement in the orthogonal direction "y". Accordingly, the sheet positioning device of JP-2001-171893-A cannot align the recording sheet S properly.

SUMMARY OF THE INVENTION

The present invention describes a novel sheet positioning device including a sheet setting plate to accommodate a sheet of recording medium set thereon, a first regulating member disposed along one side of the sheet setting plate to move in an orthogonal direction perpendicular to a conveyance direction of the sheet and regulating a position of a first end of the sheet set on the sheet setting plate in the orthogonal direction by contacting the first end of the sheet in the orthogonal direction, a second regulating member disposed opposite and facing the first regulating member along a second opposed side of the sheet setting plate to regulate a position of a second end of the sheet in the orthogonal direction by contacting the second end of the sheet in the orthogonal direction, a driving mechanism to move at least the first regulating member in the orthogonal direction, a first contact detector mounted on the first regulating member to detect that the first end of the sheet set on the sheet setting plate contacts thereto and including a first contact surface extending over an entire sheet loadable range in a sheet setting direction on the sheet setting plate to contact with the sheet, a second contact detector mounted on the second regulating member to detect that the second end of the sheet set on the sheet setting plate contacts thereto, the second contact detector including a second contact surface extending over the entire sheet loadable range in the sheet setting direction on the sheet setting plate to contact with the sheet, and a controller to stop the driving mechanism based on detection results obtained by the first contact detector and the second contact detector and to cause the first regulating member and the second regulating member to adjust a position of the sheet set on the sheet setting plate in the orthogonal direction to a predetermined position.

The first contact detector may include a plurality of first detecting points to detect contact with the first end of the sheet at different positions from each other in the sheet setting direction, and the second contact detector may include a plurality of second detecting points to detect contact with the second end of the sheet at different positions from each other in the sheet setting direction.

The controller may cause the driving mechanism to stop driving based on detection results that indicate that a first sheet loadable height obtained by a detection result of the plurality of first detecting points of the first contact detector is equal to a second sheet loadable height obtained by a detection result of the plurality of second detecting points of the second contact detector, and that respective detecting points on the first contact detector and the second contact detector at the height of the top of the sheet contact and detect the sheet and different detecting points located below the respective detecting points contact and detect the sheet.

Both the first contact detector and the second contact detector may include multipoint pressure sensitive members.

The first regulating member may include a first overhang disposed at a height equal to or above a sheet loadable range of the first regulating member and extending from a side wall of the first regulating member toward the second regulating member, and the second regulating member may include a second overhang disposed at a height equal to or above a sheet loadable range of the second regulating member and extending from a side wall of the second regulating member toward the first regulating member.

The first overhang of the first regulating member may be rotatable about a shaft extending from the side wall of the first regulating member, and the second overhang of the second regulating member may be rotatable about a shaft extending from the side wall of the second regulating member.

The first contact detector may include a plurality of projections disposed on the side wall facing the first end of the sheet along the sheet loading direction, and the second contact detector may include a plurality of projections disposed on the side wall facing the second end of the sheet along the sheet loading direction.

Further, a novel sheet holding receptacle includes a sheet setting plate to receive at least one sheet thereon to adjust the at least one sheet to a predetermined position, and the above-described sheet positioning device.

Further, a novel image forming apparatus includes at least one of an image forming mechanism to feed a sheet and form an image on at least one surface of the sheet and an image reading mechanism to read an image formed on an original document sheet. The at least one of the image forming mechanism and the image reading mechanism includes the above-described sheet positioning device.

BRIEF DESCRIPTION OF THE SEVERAL VIEWS OF THE DRAWINGS

A more complete appreciation of the invention and many of the advantages thereof will be obtained as the same becomes better understood by reference to the following detailed description when considered in connection with the accompanying drawings, wherein:

FIG. 2 is an enlarged front view illustrating a part of the sheet positioning device with a recording sheet placed on a sheet setting plate of the image forming apparatus of FIG. 1;

FIG. 3 is an enlarged front view illustrating a part of the sheet positioning device with the recording sheet contacting a side face of the side fence of the image forming apparatus of FIG. 1;

FIG. 4 is an enlarged front view illustrating a part of the sheet positioning device with the side fence slidably moving further from the state of FIG. 2;

DETAILED DESCRIPTION OF THE INVENTION

Figure 1:
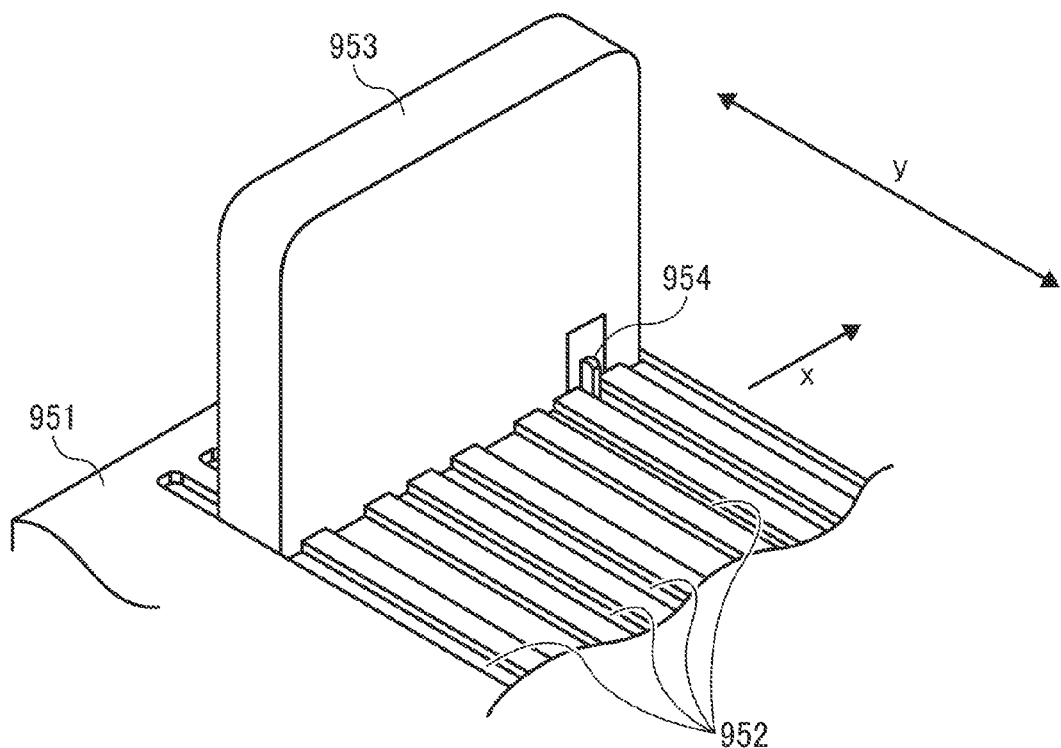
FIG. 1 is an enlarged perspective view illustrating a part of a sheet positioning device included in a known image forming apparatus.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to the present invention. Elements having the same functions and shapes are denoted by the same reference numerals throughout the specification and redundant descriptions are omitted. Elements that do not require descriptions may be omitted from the drawings as a matter of convenience. Reference numerals of elements extracted from the patent publications are in parentheses so as to be distinguished from those of exemplary embodiments of the present invention.

The present invention is applicable to any image forming apparatus, and is implemented in the most effective manner in an electrophotographic image forming apparatus.

In describing preferred embodiments illustrated in the drawings, specific terminology is employed for the sake of clarity. However, the disclosure of the present invention is not intended to be limited to the specific terminology so selected and it is to be understood that each specific element includes all technical equivalents that have the same function, operate in a similar manner, and achieve a similar result.

Referring now to the drawings, wherein like reference numerals designate identical or corresponding parts throughout the several views, preferred embodiments of the present invention are described.

Figure 5:
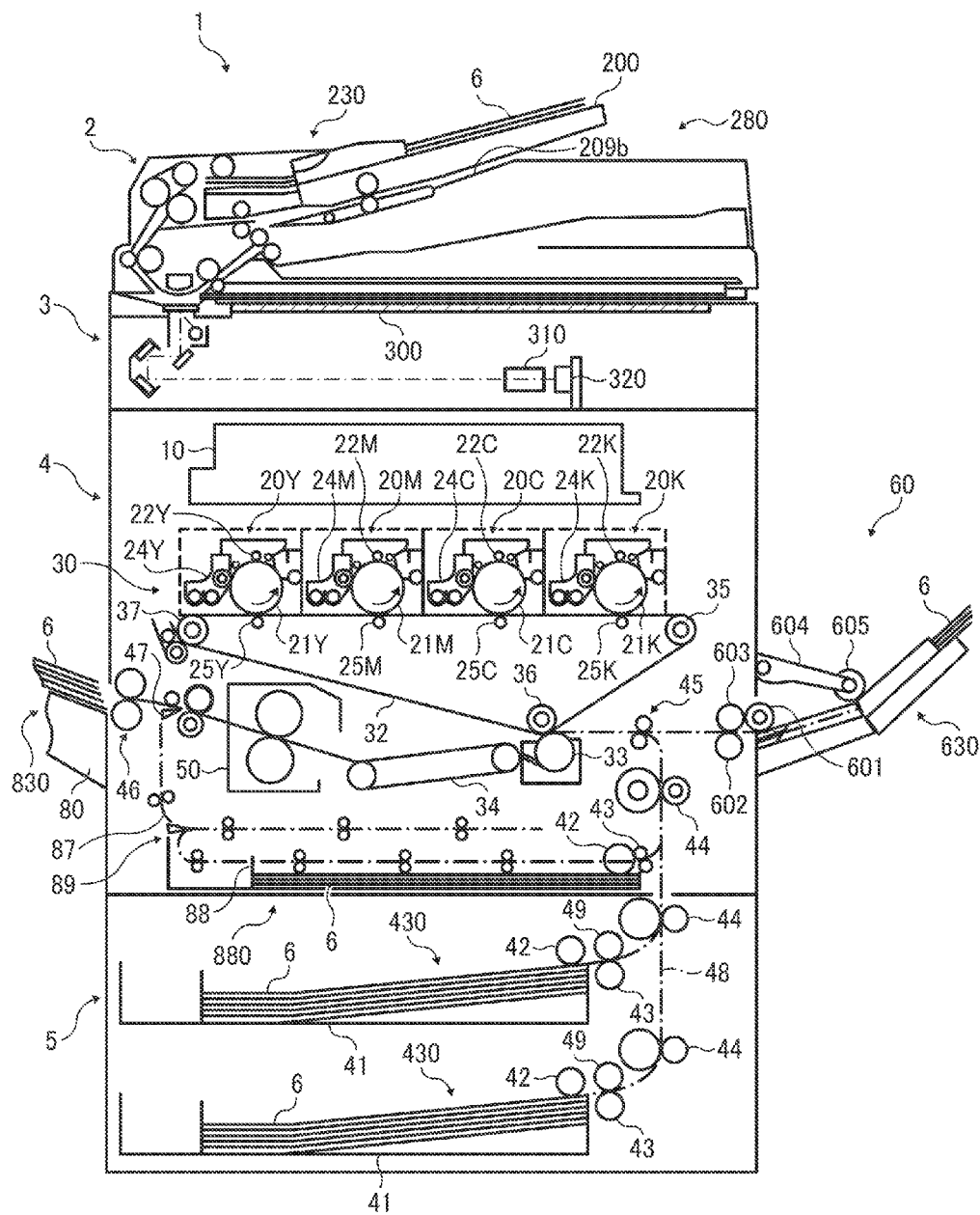
FIG. 5 is a cross-sectional view of a schematic configuration of an image forming apparatus according to an exemplary embodiment of the present invention.

A description is given of a configuration of an image forming apparatus 1 according to an exemplary embodiment of the present invention, with reference to FIG. 5.

As illustrated in FIG. 5, the image forming apparatus 1 may be a copier, a facsimile machine, a printer, a multifunction printer having at least one of copying, printing, scanning, plotter, and facsimile functions, or the like. The image forming apparatus 1 may form an image by an electrophotographic method, an inkjet method, or any other suitable method. According to this exemplary embodiment, the image forming apparatus 1 functions as a copier for forming an image on a recording medium by the electrophotographic method.

As illustrated in FIG. 5, the image forming apparatus 1 includes an image forming mechanism and an image reading mechanism. The image forming mechanism includes an image forming unit 4 and a sheet feeding unit 5, and the image reading mechanism includes an automatic document feeder (ADF) 2 and a scanner 3.

The image feeding unit 5 of the image forming mechanism includes a sheet feeding cassette 41 that serves as a sheet holding receptacle to accommodate multiple recording sheets including a recording sheet 6 serving as a sheet member on which an image is formed.

The image forming unit 4 of the image forming mechanism includes four process cartridges 20Y, 20M, 20C, and 20K on which yellow (Y) toner images, magenta (M) toner images, cyan (C) toner images, and black (K) toner images are formed, respectively, and a transfer unit 30.

The scanner 3 of the image reading mechanism optically reads an image of an original document sheet P.

The ADF 2 of the image reading mechanism automatically conveys an original document sheet P to an original document reading position of the scanner 3.

In FIG. 5, the image forming apparatus 1 according to this exemplary embodiment of the present invention is illustrated from a front view thereof. Accordingly, in a direction perpendicular to the surface of the drawing sheet, the view on the outward side corresponds to the front view of the image forming apparatus 1 and the view on the inward side corresponds to the back side thereof.

The image forming unit 4 includes the transfer unit 30 at a substantially center portion in a vertical direction thereof. The transfer unit 30 includes an intermediate transfer belt 32 that serves as an endless intermediate transfer member, and multiple support rollers disposed inside a loop of the intermediate transfer belt 32. The intermediate transfer belt 32 is wound around the multiple support rollers extending in a shape of an inverted triangle. Three supporting rollers 35, 36, and 37 of the supporting rollers are disposed at respective, three vertexes of the inverted triangle, each of which has a large angled corner by contacting the circumferential surface thereof to the intermediate transfer belt 32. Any one of the three supporting rollers 35, 36, and 37 serves as a belt driver to rotate the intermediate transfer belt 32 endlessly in a clockwise direction in FIG. 5.

A belt cleaning unit is disposed in contact with an outer surface of the loop of the intermediate transfer belt 32 at the large angled corner of the supporting roller 37 disposed on the left side in FIG. 5. This belt cleaning unit removes residual toner remaining on the surface of the intermediate transfer belt 32 after the intermediate transfer belt 32 has passed a secondary transfer nip, which will be described below.

After passing the contact position formed between the supporting roller 37 and the intermediate transfer belt 32, a horizontal belt range that is formed between the supporting roller 37 and the supporting roller 35 disposed on the right side of FIG. 5 runs straight in a substantially horizontal direction. Four process cartridges 20Y, 20M, 20C, and 20K for yellow (Y) toner, magenta (M) toner, cyan (C) toner, and black (K) toner are disposed along the belt moving direction above the horizontal belt range.

The process cartridges 20Y, 20M, 20C, and 20K form yellow, magenta, cyan, and black toner images to transfer onto the surface of the intermediate transfer belt 32 in an overlaying manner to form a composite toner image. The image forming apparatus 1 according to this exemplary embodiment of the present invention employs a tandem-type configuration in which the yellow, magenta, cyan, and black toner images are formed in tandem by the process cartridges 20Y, 20M, 20C, and 20K. Even though the image forming apparatus 1 according to this exemplary embodiment arranges the process cartridges 20Y, 20M, 20C, and 20K in this order, the order is not limited thereto and can be arranged optionally.

In the image forming unit 4, the process cartridges 20Y, 20M, 20C, and 20K include drum-shaped photoconductors 21Y, 21M, 21C, and 21K that serve as an image carrier, respectively. Respective charging units including charging rollers 22Y, 22M, 22C, and 22K, developing units 24Y, 24M, 24C, and 24K, photoconductor cleaning units and electrical discharging units, and so forth are disposed around the drum-shaped photoconductors 21Y, 21M, 21C and 21K, respectively.

As described above, a primary transfer bias generated by a power source is applied to the charging unit that includes the charging rollers 22Y, 22M, 22C, and 22K, serving as charging members, disposed facing the photoconductors 21Y, 21M, 21C, and 21K. This causes charging between the charging rollers 22Y, 22M, 22C, and 22K and the photoconductors 21Y, 21M, 21C, and 21K, respectively, so as to uniformly charge the surfaces of the photoconductors 21Y, 21M, 21C, and 21K. In the image forming apparatus 1 according to this exemplary embodiment, the surfaces of the photoconductors 21Y, 21M, 21C, and 21K are charged to a negative polarity that is the same polarity as a regular charging polarity of toner.

The charging units of the image forming apparatus 1 can use any charging member other than the above-described charging rollers 22Y, 22M, 22C, and 22K. For example, the image forming apparatus 1 can employ a corona charging method using corona wires such as tungsten wires or a brush charging method using an electrically conductive brush. In addition, a charging member such as a charging roller used in the charging unit of the image forming apparatus 1 can be applied in a contact method in which the charging member is disposed in contact with the photoconductors 21Y, 21M, 21C, and 21K as described above or in a non-contact method in which the charging member is disposed without contacting the photoconductor 21 (i.e., the photoconductors 21Y, 21M, 21C, and 21K) or disposed facing the photoconductor with a gap therebetween.

An optical writing device 10 is disposed above the four process cartridges 20Y, 20M, 20C, and 20K. The optical writing device 10 and the charging units including the charging rollers 22Y, 22M, 22C, and 22K serve as a latent image forming unit to form electrostatic latent images on the surfaces of the photoconductors 21Y, 21M, 21C, and 21K. The optical writing unit 10 emits laser light beams of yellow, magenta, cyan, and black toner images generated based on image data obtained through image reading by the scanner 3 or image data transmitted from an external personal computer to optically scan the surfaces of the photoconductors 21Y, 21M, 21C, and 21K that rotate in a counterclockwise direction in FIG. 5 after the surfaces thereof are charged uniformly.

Exposed portions that are areas optically scanned on the entire surfaces of the photoconductors 21Y, 21M, 21C, and 21K can attenuate the potential compared with the background portions that are areas not optically scanned thereon. Therefore, the electrostatic latent image is formed and held on the exposed portions. Examples of the optical writing device 10 are a device generating optical lights by laser diodes or LED arrays.

The developing units 24Y, 24M, 24C, and 24K develop Y, M, C, and K electrostatic latent images formed on the surfaces of the photoconductors 21Y, 21M, 21C, and 21K with Y, M, C, and K toners into visible Y, M, C, and K toner images. The photoconductors 21Y, 21M, 21C and 21K contact the outer surface of the loop of the intermediate transfer belt 32 to form respective primary transfer nips. On the opposite side of the primary transfer nips, the primary transfer rollers 25Y, 25M, 25C, and 25K are disposed in contact with the inner surface of the loop of the intermediate transfer belt 32 with the intermediate transfer belt 32 interposed therebetween. A primary transfer bias has positive polarity that is an opposite polarity to a regular charging polarity of toner and is applied to each of the primary transfer rollers 25Y, 25M, 25C, and 25K. The Y toner image formed on the photoconductor 21Y is formed on the outer surface of the intermediate transfer belt 32 in the Y primary transfer nip. Then, the surface of the intermediate transfer belt 32 having the Y toner image thereon passes the M, C, and K primary transfer nips formed with the primary between the intermediate transfer belt 32 and the primary transfer rollers 25M, 25C, and 25K sequentially, so that the M, C, and K toner images formed on the photoconductors 21M, 21C, and 21K are overlaid on the Y toner image in this order to form a composite color toner image on the surface of the intermediate transfer belt 32.

After passing through the Y, M, C, and K primary transfer nips, the surfaces of the photoconductors 21Y, 21M, 21C, and 21K are cleaned by the photoconductor cleaning units 23Y, 23M, 23C, and 23K by removing residual toner remaining thereon. Then, the electric discharging units electrically discharge the surfaces of the photoconductors 21Y, 21M, 21C, and 21K to be ready for a subsequent image forming operation.

Among the supporting rollers 35, 36, and 37 having the large angled corners disposed in contact with the inner surface of the loop of the intermediate transfer belt 32, the supporting roller 36 disposed at the lowest position contacts a secondary transfer roller 33 that serves as a secondary transfer member from the outer surface of the loop thereof to form a secondary transfer nip. A power source applies a secondary transfer bias to the secondary transfer roller 33 or the supporting roller 36, so that a secondary transfer electric field can be formed disposed between the supporting roller 36 and the secondary transfer roller 33 to electrostatically move the composite color toner image formed on the intermediate transfer belt 32 toward the secondary transfer roller 33.

A pair of registration rollers 45 is disposed on the right hand side of the secondary transfer nip in FIG. 5. The pair of registration rollers 45 includes two rollers contacting to each other to form a registration nip and rotating in a normal direction. The recording sheet 6 fed from the sheet feeding unit 5 is conveyed to the registration nip formed between the pair of registration rollers 45. Then, the recording sheet 6 passes through the pair of registration rollers 45 and is conveyed toward the secondary transfer nip in synchronization with movement of the composite color toner image formed on the intermediate transfer belt 32. The composite color toner image formed on the intermediate transfer belt 32 is transferred onto the recording sheet 6 that is held between the secondary transfer nip with an action of the secondary transfer electric field and a nip pressure. Thus, the recording sheet 6 having the composite color toner image thereon after secondary transfer is conveyed from the secondary transfer nip via a conveyance belt 34 to a fixing unit 50.

The fixing unit 50 fixes an unfixed image formed on the recording sheet 6 sandwiched between a fixing nip formed by fixing members, which are a fixing roller and a pressure roller, by application of heat and pressure.

The recording sheet 6 conveyed from the fixing unit 50 comes close to a branch of the conveyance path at which a path switching claw 47 is disposed. The path switching claw 47 changes or switches the direction of the recording sheet 6 downstream therefrom to one of a sheet discharging path and a reverse conveyance path 87. When a single-side printing mode is selected as a printing operation mode, the path switching claw 47 guides the recording sheet 6 to the sheet discharging path. By contrast, when a duplex printing mode is selected as the printing operation mode and when the recording sheet 6 that has passed through the secondary transfer nip has toner images on both first and second faces, the path switching claw 47 also guides the recording sheet 6 to the sheet discharging path. The recording sheet 6 that has entered the sheet discharging path is conveyed through a sheet discharging nip of a pair of discharging rollers 46 to be discharged and stacked on a sheet discharging tray 80 that is fixedly disposed to an outer side of an apparatus body of the image forming apparatus 1.

By contrast, when the duplex printing mode is selected as the printing operation mode and when the recording sheet 6 that has passed through the secondary transfer nip has a toner image on one side or the first face, the path switching claw 47 guides the recording sheet 6 to the reverse conveyance path 87. Therefore, in the duplex printing mode, the recording sheet 6 having a toner image on the first face is conveyed out from the fixing unit 50 and is guided to the reverse conveyance path 87. The reverse conveyance path 87 includes a reverse conveyance unit 89. While reversing the recording sheet 6 conveyed from the fixing unit 50, the reverse conveyance unit 89 stacks the recording sheet 6 temporarily in a duplex transit tray 88 or conveys the recording sheet 6 to the registration nip formed between the pair of registration rollers 45 again. The recording sheet 6 returned to a conveyance path 48 by the reverse conveyance unit 89 passes through the registration nip of the pair of registration rollers 45 and the secondary transfer nip so that a toner image is secondarily transferred onto a second face of the recording sheet 6. Then, the recording sheet 6 travels through the fixing unit 50, the path switching claw 47, the conveyance path 48, and the pair of sheet discharging rollers 46 to be discharged and stacked on the sheet discharging tray 80.

The sheet feeding unit 5 disposed directly below the image forming unit 4 includes the two sheet feeding cassettes 41, which are disposed along a vertical direction, the conveyance path 48, and multiple conveyance rollers 44. The sheet feeding cassettes 41, each serving as a sheet holding receptacle, are removably installable by slidably moving in a normal and reverse direction to a body of the sheet feeding unit 5, which is a direction perpendicular to the surface of the drawing sheet or an orthogonal direction.

The sheet feeding unit 5 further includes sheet feed rollers 42 that are supported by a supporting unit provided in the body of the sheet feeding unit 5. Each of the sheet feed rollers 42 is pressed against the stack of the recording sheets 6 contained in each of the sheet feeding cassettes 41 that are set in the body of the sheet feeding unit 5. When the sheet feed roller 42 rotates with the sheet feed rollers 42 pressed against the stack of the recording sheets 6, an uppermost recording sheet 6 placed on top of the sheet stack is fed toward the conveying path 48.

Before entering the conveyance path 48, the recording sheet 6 enters a separation nip formed between the conveyance roller 49 and the separation roller 43. One of the two rollers, the conveyance roller 49 is rotated in a direction to convey the recording sheet 6 from the sheet feeding cassette 41 toward the conveyance path 48.

By contrast, the separation roller 43 is rotated in a direction to convey the recording sheet 6 from the conveyance path 48 toward the sheet feeding cassette 41. However, a drive transmission system to transmit a driving power of rotation to the separation roller 43 includes a torque limiter. If the separation roller 43 directly contacts the conveyance roller 49, the amount of torque can be overloaded. Therefore, the torque limiter limits the torque or the driving power of rotation by uncoupling the load so that the separation roller 43 is rotated with the conveyance roller 49. By contrast, when the multiple recording sheets 6 enter the separation nip at one time, the recording sheets 6 slip therebetween, and therefore the torque limiter can make the amount of torque smaller than the upper limit thereof. As a result, the separation roller 43 rotates to convey the recording sheet 6 that is in contact with the separation roller 43 directly among the multiple recording sheets 6 in a reverse direction toward the sheet feeding cassette 41. The reverse conveyance of the recording sheets 6 continues until only one recording sheets 6 remains in the separation nip and slippage between the recording sheets 6 no longer occurs. With this action, one separated recording sheet 6 can be fed to the conveyance path 48. After passing through respective conveyance nips of the multiple conveyance rollers 44, the separated recording sheet 6 reaches the registration nip formed between the pair of registration rollers 45 of the image forming unit 4.

As illustrated on the right hand side of FIG. 5, the image forming unit 4 supports a manual feed tray 60. The manual feed tray 60 presses a manual feed roller 601 against an uppermost recording sheet 6 placed on top of the sheet stack held on a sheet setting plate thereof. With rotation of the manual feed roller 601, the uppermost recording sheet 6 is fed to the pair of registration rollers 45. The fed uppermost recording sheet 6 passes through a separation nip formed between a conveyance roller 603 and a separation roller 602 before reaching the pair of registration rollers 45. At this time, the recording sheet 6 is separated from the other recording sheets of the sheet stack based on the same principle as the separation nip formed between the separation roller 43 and the conveyance roller 44 of the sheet feeding cassettes 41 located on the right hand side in FIG. 5.

Figure 6:
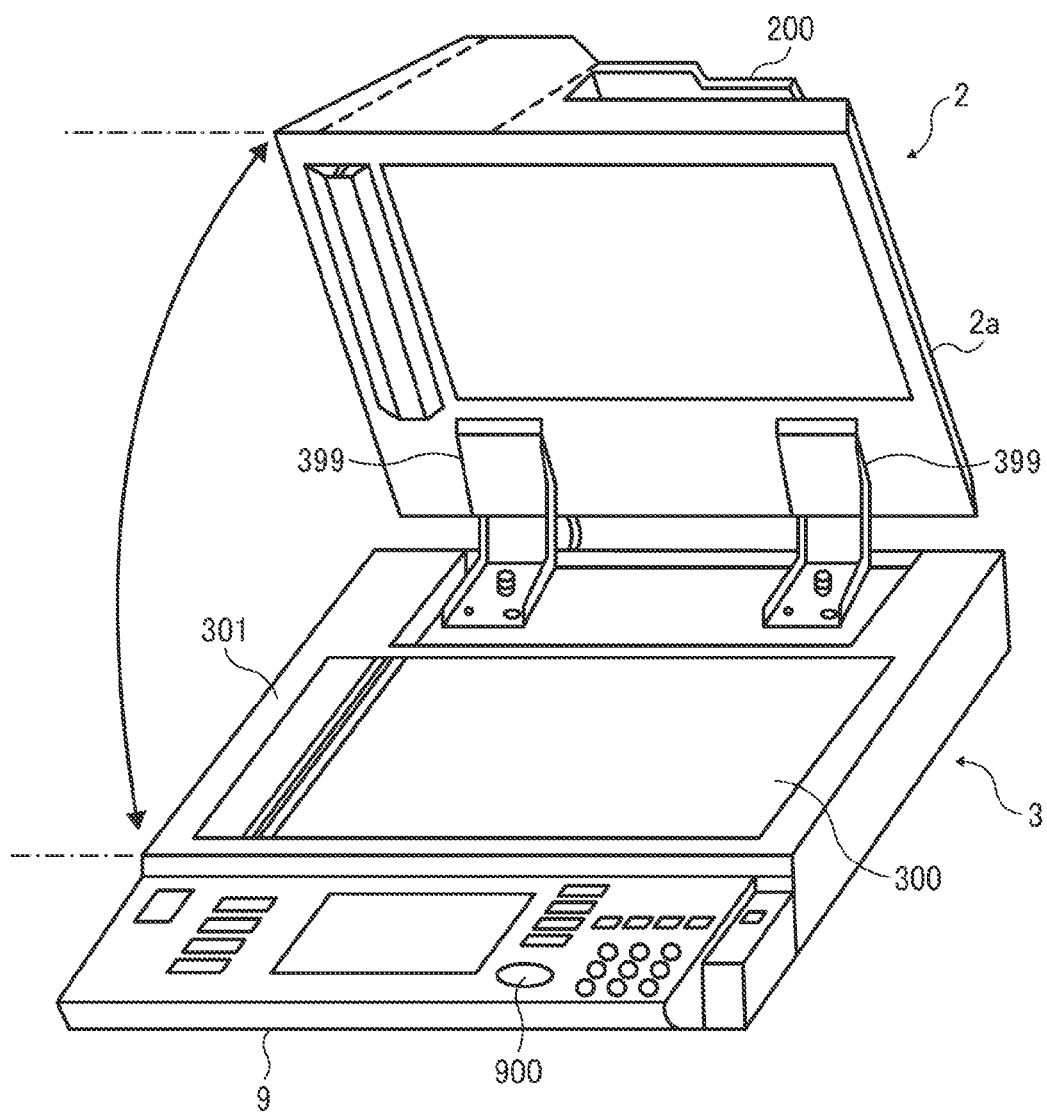
FIG. 6 is an enlarged perspective view of a scanner and an automatic document feeder (ADF) of the image forming apparatus of FIG. 5.

FIG. 6 illustrates an enlarged perspective view of the scanner 3 and the ADF 2 provided as the image reading mechanism to the image forming apparatus 1 according to this exemplary embodiment of the present invention.

As illustrated in FIG. 6, the scanner 3 and the ADF 2 placed on the scanner 3 are connected by hinges 399. The ADF 2 is supported by the scanner 3 to swing in a direction indicated by a bi-directional bowed arrow illustrated in FIG. 2. With this swinging movement, the ADF 2 can move to an open position at which a first contact glass 300 and a second contact glass 301 that form an upper surface of the scanner 3 are exposed and move to a closed position at which the ADF 2 is placed directly on the first contact glass 300 and the second contact glass 301.

In the image forming apparatus 1 according to this exemplary embodiment of the present invention, when it is difficult to set original documents such as thick paper documents or stapled documents on the ADF 2, an operator opens a cover 2a of the ADF 2 as illustrated in FIG. 6 to expose the upper surface of the scanner 3. After setting a document sheet on the first contact glass 300, the operator closes the cover 2a of the ADF 2 and presses the document sheet by the ADF 2 against the first contact glass 300. By pressing a copy start button 900 located on an operation display 9 that is fixedly disposed to the scanner 3, the operator can start a copying operation.

Figure 7:
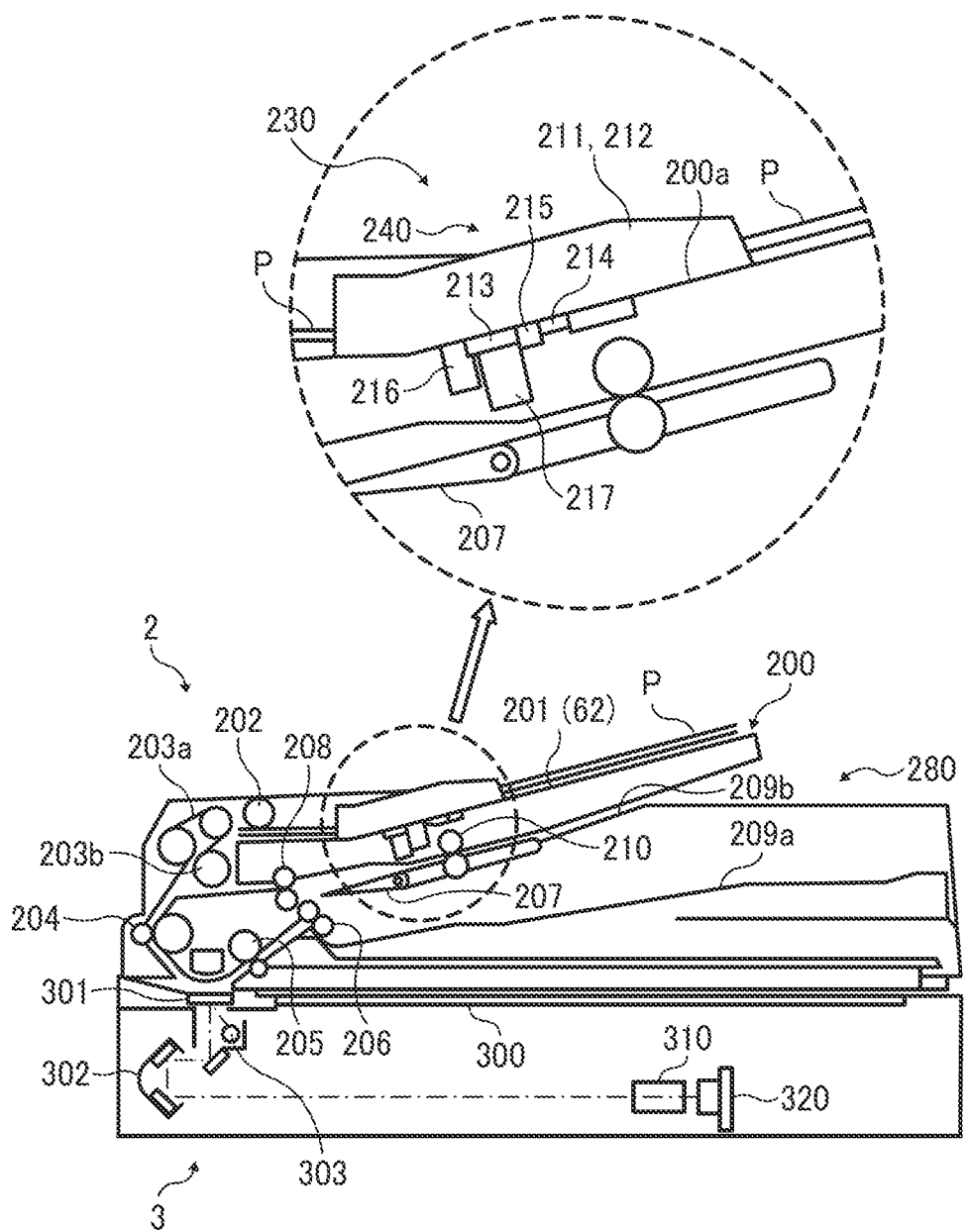
FIG. 7 is an enlarged view of the scanner and the ADF.

FIG. 7 illustrates an enlarged view of the ADF 2 and the scanner 3. When printing a copy or copies of an original document sheet P that can be fed automatically by the ADF 2, an operator sets one original document sheet P or a sheet stack of original document sheets P on a document processing tray 200 of the ADF 2 with the cover 2a of the ADF 2 closed, as illustrated in FIG. 7, and presses the copy start button 900 to start the copying operation. The copying operation mainly includes a document reading operation performed by the scanner 3 and an image forming operation performed by the image forming unit 4. Immediately after the copy start button 900 is pressed, the document reading operation starts.

The scanner 3 includes a moving unit 302, an image forming lens 310, and an image reading sensor 320 below the first contact glass 300 and the second contact glass 301. The moving unit 302 includes a scanning lamp 303 and multiple reflection mirrors and is movable in a horizontal direction in FIG. 7 driven by a driving mechanism. Laser light beam emitted from the scanning lamp 303 is reflected on an image formed on the original document sheet P set on the first contact glass 300 or the original document sheet P being processed on the second contact glass 301, and becomes to an image reading light beam. The image reading light beam is reflected on the multiple reflection mirrors disposed on the moving unit 302, travels via the image forming lens 310 fixedly disposed to the scanner 3, and reaches the image reading sensor 320 to form an image at a focal position for the image reading sensor 320. With the above-described operation, an image of an original document sheet is read.

When reading the image of the original document sheet P set on the first contact glass 300, the moving unit 302 of the scanner 3 scans the original document sheet P while moving from the position illustrated in FIG. 7 toward the right direction in FIG. 7 to read the image of the original document sheet P sequentially from left to right of FIG. 7.

By contrast, when reading an image of an original document sheet P set on the ADF 2, the moving unit 302 remains stopped at the position illustrated in FIG. 7 and the scanning lamp 303 turns on to emit light toward the second contact glass 301. At this time, the ADF 2 starts to feed the original document sheet P set on a tray face 201 of the document processing tray 200 to a position immediately above the second contact glass 301 of the scanner 3. As a result, while the moving unit 302 stays at the position illustrated on FIG. 7, the image on the original document sheet P can be read sequentially from the leading edge to the trailing edge of the original document sheet P in the sheet conveyance direction.

A sheet feed roller 202 is disposed above the sheet stack of the original document sheets P set on the document processing tray 200 of the ADF 2 with a scanning face up. The sheet feed roller 202 is supported vertically movable by a cam mechanism. The sheet feed roller 202 moves in a downward direction to contact the uppermost original document sheet P of the sheet stack and starts its rotation while contacting the uppermost original document sheet P. With this action, the uppermost original document sheet P is fed from the document processing tray 200 of the ADF 2. The original document sheet P then enters a separation nip formed between an endless conveyance belt 203a and a reverse roller 203b.

The conveyance belt 203a is extended and wound around a drive roller and a driven roller. As the drive roller rotates in a normal direction according to rotation of a sheet feed motor in the normal direction, the conveyance belt 203a is rotated endlessly in the clockwise direction of FIG. 7. The reverse roller 203b that rotates in the clockwise direction in FIG. 7 according to the normal rotation of the sheet feed motor contacts an extended outer surface of the conveyance belt 203a so as to form the separation nip.

In the separation nip, the surface of the conveyance belt 203a moves in the sheet conveyance direction.

When the reverse roller 203b directly contacts the conveyance belt 203a or when only one original document sheet P is sandwiched in the separation nip, the torque limiter disposed in the drive transmission path extending from the sheet feed motor to the reverse roller 203b limits the torque or the driving power transmitted from the sheet feed motor by uncoupling the load from the sheet feed motor to the reverse roller 203b. As a result, the reverse roller 203b is rotated with rotation of the conveyance belt 203a to convey the original document sheet P in the sheet conveyance direction.

By contrast, when the multiple original document sheets P enter the separation nip at one time, the original document sheets P slip therebetween, and therefore the torque limiter can make the amount of torque smaller than a threshold thereof. As a result, the driving power transmitted from the sheet feed motor is coupled to the reverse roller 203b so that the reverse roller 203b rotates in the clockwise direction in FIG. 7. Among the multiple original document sheets P, the original document sheet P that contacts the reverse roller 203b directly is conveyed toward the document processing tray 200. This operation to reverse the direction of conveyance of the original document sheet P is continued until only one original document sheet P remains in the separation nip. Eventually, the only one original document sheet P separated from the other original document sheets P of the sheet stack passes through the separation nip.

A curved conveyance path having a large U-shaped curve is formed downstream from the separation nip in the sheet conveyance direction. After passing through the separation nip, the original document sheet P is conveyed by largely curving along the curved conveyance path while being sandwiched in a conveyance nip formed between a pair of conveyance rollers 204 disposed in the curved conveyance path. This reverses the original document sheet P to face up the other face that is vertically opposite the scanning face to the second contact glass 301 of the scanner 3. As the original document sheet P passes immediately above the second contact glass 301 with the other face thereof facing the second contact glass 301, an image formed on the other face can be read by the scanner 3. After passing over the second contact glass 301, the original document sheet P further passes through a pair of first post-scanning sheet conveyance rollers 205 and a pair of second post-scanning sheet conveyance rollers 206 sequentially.

When a single-side reading mode is selected as a document reading mode, a switching claw 207 that is disposed rotatably about a rotation shaft stays unmoved at a position as illustrated in FIG. 3. With the switching claw 207 staying at this position, the original document sheet P after passing through the pair of second post-scanning sheet conveyance rollers 206 is conveyed to a sheet discharging tray 209a without contacting the switching claw 207 and is stacked in the sheet discharging tray 209a.

By contrast when a duplex reading mode is selected as the document reading mode and when only one scanning face of the original document sheet P has been scanned after being conveyed from the pair of second post-scanning sheet conveyance rollers 206, a free end of the switching claw 207 is moved in a downward direction from the position as illustrated in FIG. 7. Then, the original document sheet P that has passed through the pair of second post-scanning sheet conveyance rollers 206 is guided over the switching claw 207 to enter and be held between two rollers of a pair of relay rollers 210. At this time, the pair of duplex transit rollers 210 is rotating in a direction to convey the original document sheet P to a duplex transit tray 209b that is disposed on the right-hand side of the pair of duplex transit rollers 210 in FIG. 7. According to this action, the pair of duplex transit rollers 210 stops rotating immediately before the original document sheet P is conveyed to the duplex transit tray 209b and the trailing edge of the original document sheet P passes through the pair of duplex transit rollers 210. Then, the pair of duplex transit rollers 210 starts to rotate in a reverse direction. At the substantially same time, the switching claw 207 moves to the position as illustrated in FIG. 7 again. Thus, the original document sheet P is switched back so as to convey the original document sheet P from the pair of duplex transit rollers 210 toward a pair of re-feed rollers 208 disposed substantially just above the pair of second post-scanning sheet conveyance rollers 206.

The original document sheet P held between the pair of re-feed rollers 208 is set with the unread scanning face up in a vertical direction. With this condition, the pair of re-feed rollers 208 starts rotating to convey the original document sheet P to the curved conveyance path and to pass immediately above the second contact glass 301 with the unread scanning face down so that the image formed on the unread scanning face of the original document sheet P can be read. Accordingly, the original document sheet P after the other scanning face thereof has been read successfully passes through the pair of second post-scanning sheet conveyance rollers 206 with the switching claw 207 staying at the position as illustrated in FIG. 7, and is stacked on the sheet discharging tray 209a.

Next, a description is given of a detailed configuration of the image forming apparatus 1 according to this exemplary embodiment of the present invention.

Figure 8:
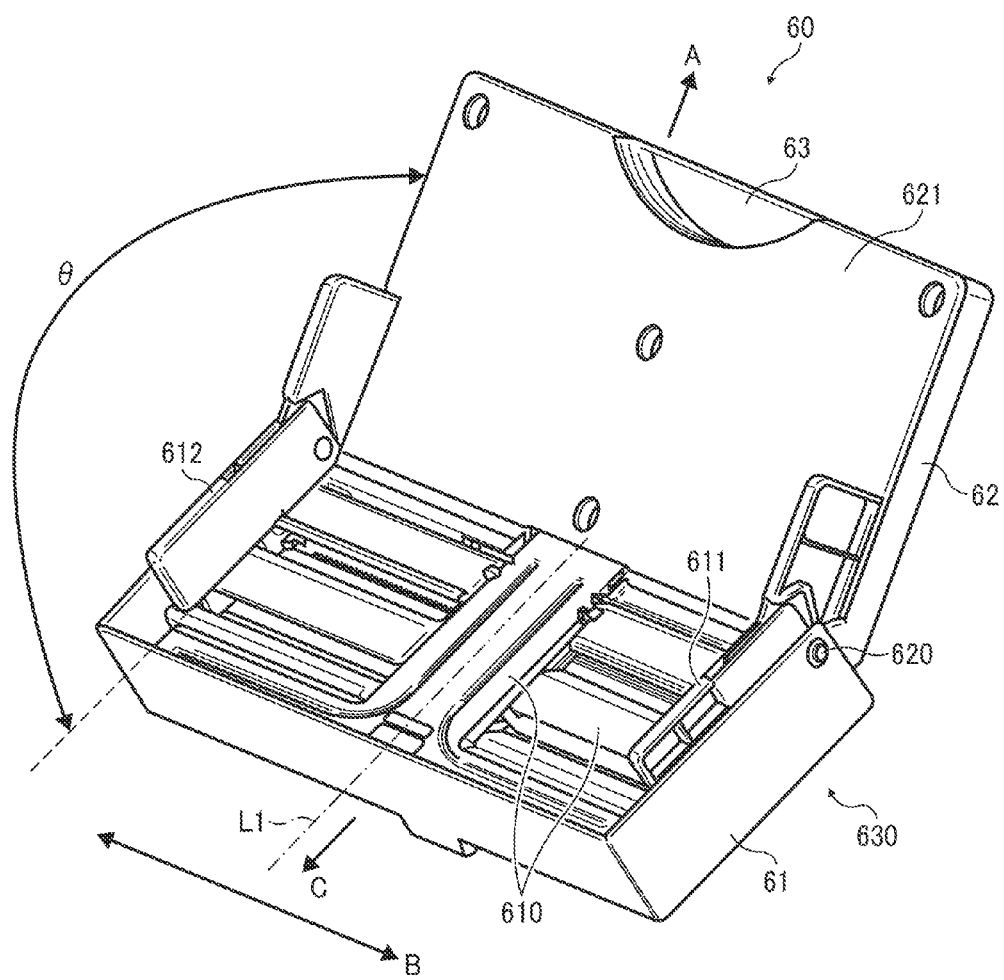
FIG. 8 is an enlarged perspective view of a manual feed tray of the image forming apparatus of FIG. 5.

FIG. 8 is an enlarged perspective view that illustrates a manual feed tray 60 of the image forming apparatus 1 according to this exemplary embodiment of the present invention.

As illustrated in FIG. 8, the manual feed tray 60 includes a first setting portion 61 and a second setting portion 62. Arrow C in FIG. 8 indicates a sheet conveyance direction or a direction to which the recording sheet 6 placed on the manual feed tray 60 is fed therefrom. Over the entire region in the sheet conveyance direction on the manual feed tray 60 where the recording sheet 6 placed is fed and conveyed, the first setting portion 61 holds the leading end portion of the recording sheet 6 and the second setting portion 62 holds the trailing end portion of the recording sheet 6. The second setting portion 62 is supported by the first setting portion 61 to rotate about a shaft 620.

In the manual feed tray 60, a sheet receiving face of the bottom plate 610 of the first setting portion 61 and a sheet receiving face 621 of the second setting portion 62 together constitute a sheet setting plate for setting the recording sheet 6. The sheet receiving face of the bottom plate 610 of the first setting portion 61 works as a leading end portion sheet setting plate and the sheet receiving face 621 of the second setting portion 62 works as a trailing end portion sheet setting plate of the entire area of the sheet setting plate.

In FIG. 8, arrow B indicates a direction that is perpendicular (orthogonal) to a sheet conveyance direction on the sheet setting plate of the manual feed tray 60. A broken line L1 illustrates a centerline of the manual feed tray 60 in the sheet conveyance direction. On the bottom plate 610 of the first setting portion 61, slits (not visible in FIG. 8) are formed extending along the orthogonal direction, that is, the direction indicated by arrow B. Further, a first side fence 611 and a second side fence 612 are disposed to slide along the slits on the bottom plate 610. Each of the first side fence 611 and the second side fence 612 includes foot extending to a lower part below the bottom plate 610 through the slits of the bottom plate 610. The foot of the first side fence 611 and the foot of the second side fence 612 are supported by a driving mechanism 640, shown for example, in FIG. 9.

The first side fence 611 that serves as a first regulating member regulates one end position of the recording sheet 6 placed on the sheet setting plate in the sheet conveyance direction. Further, the second side fence 612 that serves as a second regulating member regulates the other end position of the recording sheet 6 placed on the sheet receiving face 621 in the sheet conveyance direction. The first side fence 611 and the second side fence 612 slide in a direction close to the centerline L1 or in a direction away from the centerline L1 while extending in the sheet conveyance direction indicated by arrow C. As illustrated in FIG. 8, the first side fence 611 and the second side fence 612 are disposed at positions farthest from the centerline L1 in a movable area. The above-described positions are respective home positions for both of the first side fence 611 and the second side fence 612.

A guide container is provided at the trailing end portion of the second setting portion 62 for containing a detachably attachable extension guide 63. In FIG. 8, the extension guide 63 is contained in the second setting portion 62 and can be pulled out in a direction indicated by arrow A to be extended in a direction to the trailing end portion of the second setting portion 62. When an oversized-length recording sheet is used, the extension guide 63 can be pulled out to accommodate the trailing end portion of the large recording sheet reliably.

Figure 9:
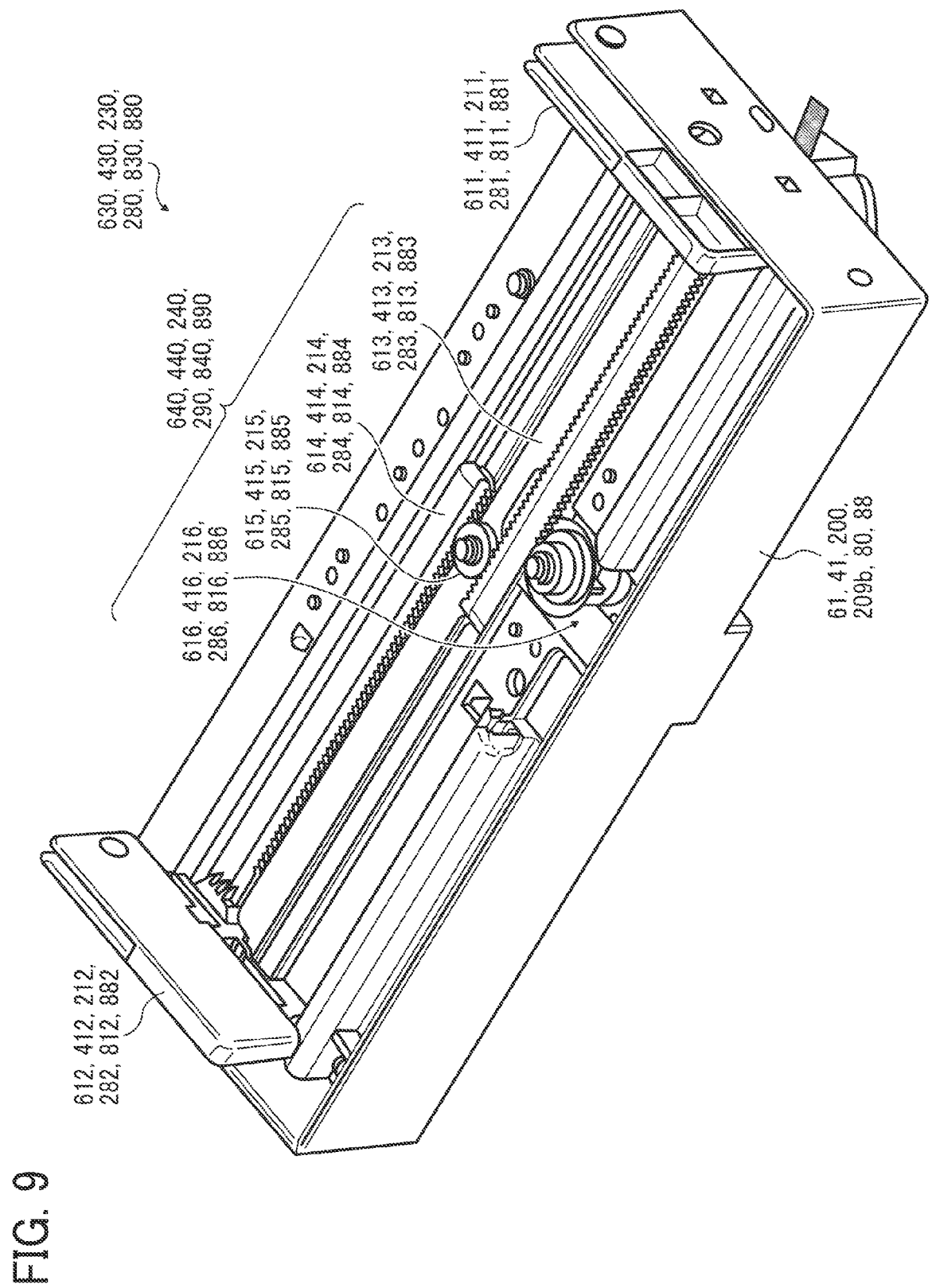
FIG. 9 is an exploded perspective view of a first sheet setting portion of the manual feed tray.

FIG. 9 is an exploded perspective view illustrating the first setting portion 61 of the manual feed tray 60. The first setting portion 61 in FIG. 9 is illustrated without the bottom plate 610 that is illustrated in FIG. 8.

As illustrated in FIG. 9, the first setting portion 61 includes the driving mechanism 640 that includes a first rack gear 613, a second rack gear 614, a linking pinion gear, and a drive transmission pulley 616 below the bottom plate 610. A driving motor 617 (FIG. 10) that serves as a driving power source transmits its driving power via the driving mechanism 640 to the first side fence 611 and the second side fence 612. With this transmission, the first side fence 611 and the second side fence 612 slide on the bottom plate along the orthogonal direction.

Figure 10:
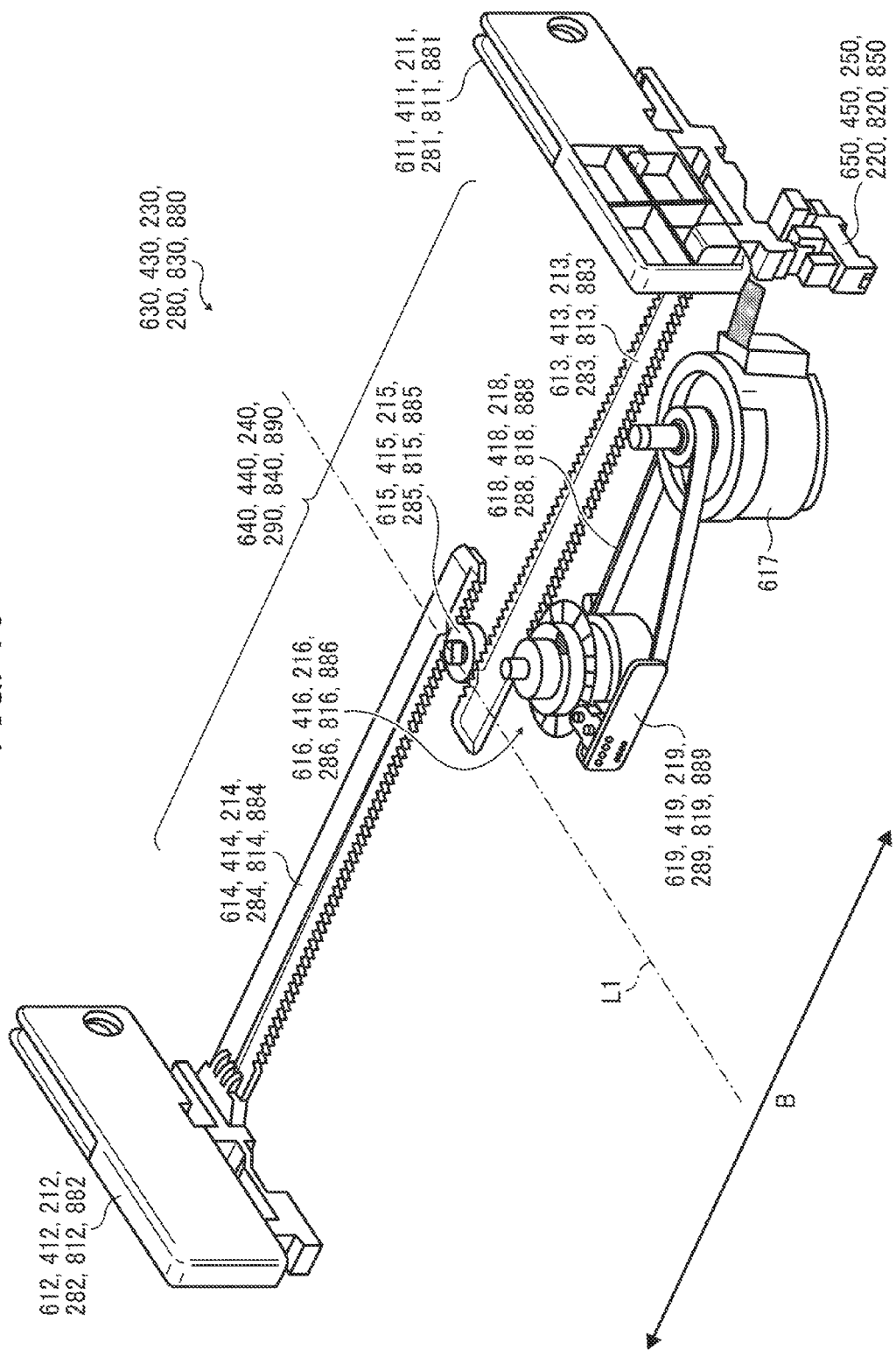
FIG. 10 is an exploded perspective view of a driving transmission mechanism of the first sheet setting portion and two side fence.

FIG. 10 is an exploded perspective view illustrating the driving mechanism 640 of the first setting portion 61, together with the first side fence 611 and the second side fence 612.

As illustrated in FIG. 10, the first rack gear 613 is integrally mounted on the foot of the first side fence 611. The first rack gear 613 is supported by the foot of the first side fence 611 in a cantilevered manner, so that the first rack gear 613 can extend from the foot straight toward the centerline L1 of the bottom plate 610 in the orthogonal direction B illustrated in FIG. 10. Similarly, the second rack gear 614 is integrally mounted on the foot of the second side fence 612. The second rack gear 614 is supported by the foot of the second side fence 612 in a cantilever manner, so that the second rack sear 614 can extend from the foot straight toward the centerline L1 of the bottom plate 610 in the orthogonal direction B illustrated in FIG. 10.

A disk-shaped linking pinion gear 615 rotates about a rotating shaft that extends along a vertical direction at the centerline L1 while being supported by the rotating shaft. The linking pinion gear 615 is meshed with the plate-shaped first rack gear 613. The linking pinion gear 615 is also meshed with the plate-shaped second rack gear 614 at a position, on the entire circumference of the linking pinion gear 615, directly opposite the meshing position with the first rack gear 613 by 180 degrees with respect to a point of the rotating shaft of the linking pinion gear 615.

Of two long lines of the plate-shaped first rack gear 613, a first long line thereof has first teeth to mesh with the linking pinion gear 615 and a second long line thereof also has second teeth to mesh with a gear of a driven side transmission unit of a drive transmission pulley 616. The first teeth of the first long line of the first rack gear 613 are formed for teeth of a drive transmitting side and the second teeth of the second long line of the first rack gear 613 are formed for teeth of a drive receiving side.

The driving motor 617 is disposed in a vicinity of the drive transmission pulley 616. The driving motor 617 includes a motor gear around which an endless timing belt 618 is wound. The timing belt 618 is also wound around a timing pulley of the drive transmission pulley 616 so that a given tension can be maintained on the timing belt 618.

When the driving motor 617 starts rotating in a normal direction, the rotation force exerted by rotation of the driving motor 617 is transmitted to the timing belt 618 and the drive transmission pulley 616, and then a force exerted at the gear of the driven side transmission unit of the drive transmission pulley 616 and the first rack gear 613 at a meshed portion of the gear of the driven side transmission unit is converted to a force exerted in an orthogonal direction perpendicular to the sheet conveyance direction. As a result, the first side fence 611 integrally attached on the first rack gear 613 slides from the position illustrated in FIG. 10 toward the centerline L1.

At the same time, a force of the first side fence 611 in the orthogonal direction is converted to a rotation force exerted in a rotation direction at the meshed portion of the first side fence 611 and the linking pinion gear 615, so as to rotate the linking pinion gear 615 in a normal direction. The rotation force is converted to a force exerted in an orthogonal direction that is a direction perpendicular to the sheet conveyance direction at the meshed portion of the linking pinion gear 615 and the second rack gear 614, so that the second side fence 612 integrally attached to the second rack gear 614 slides from the position illustrated in FIG. 10 toward the centerline L1.

When the driving motor 617 starts driving in a reverse direction, the rotation force is transmitted to the timing belt 618 and the drive transmission pulley 616, and then the first side fence 611 is slid from the centerline L1 to one end side in the orthogonal direction, which is the same side where the first side fence 611 is located in FIG. 10. At the same time, the first rack gear 613 integrally attached to the first side fence 611 slides while reversing the linking pinion gear 615. Then, the rotation force in the reverse direction of the linking pinion gear 615 is transmitted to the second rack gear 614 so as to slide the second side fence 612 from the centerline L1 to the other end side in the orthogonal direction, which is the same side where the second side fence 612 is located in FIG. 10.

Thus, when the driving motor 617 rotates in the normal direction, the first side fence 611 and the second side fence 612 slide from the end sides in the direction B toward the Centerline L1 to be close to each other. With the above-described action, the distance between the first side fence 611 and the second side fence 612 can be reduced gradually.

By contrast, when the driving motor 617 rotates in the reverse direction, the first side fence 611 and the second side fence 612 slide from the centerline L1 to the end sides in the direction B to be separated from each other. With the above-described action, the distance between the first side fence 611 and the second side fence 612 is increased gradually.

It is to be noted that, regardless of the positions of the first side fence 611 and the second side fence 612, a distance between the centerline L1 and the first side fence 611 and a distance between the second side fence 612 and the centerline L1 are always equal. Therefore, regardless of distances according to movement of the first side fence 611 and the second side fence 612, the position of the centerline L1 remains constant.

A home position sensor 650 that corresponds to a transmissive photosensor is disposed in the vicinity of the driving motor 617. In FIG. 10, the first side fence 611 and the second side fence 612 are located at the respective home positions. The first side fence 611 includes a detector portion disposed projecting downward at the foot thereof, and intervenes the detector portion in a light path defined between a light emitting unit and a light receiving unit of the home position sensor 650. By so doing, the home position sensor 650 can detect that the first side fence 611 is located at the home position.

Instead of employing the home position sensor 650 or an optical detector to detect that the first side fence 611 is at the home position, a magnetic detector or a detector using other methods can be used.

When one recording sheet 6 or a stack of recording sheets 6 are loaded on the manual feed tray 60 as described FIG. 8, an operator presses a manual sheet feeding start button provided on the operator panel of the image forming apparatus 1 prior to the sheet setting. Then, a controller 400 (FIG. 23) that serves as a driving controller and includes a CPU (Central Processing Unit, FIG. 23) 400a, a RAM (Random Access Memory, FIG. 23) 400b, a ROM (Read Only Memory, FIG. 23) 400c, and so forth drives the driving motor 617 in a reverse direction until the home position sensor 650 detects that the first side fence 611 moves to the home position. With this action, the first side fence 611 and the second side fence 612 can stop at their home positions. The first setting portion 61 includes a sheet detection sensor 66 (FIG. 23) under an opening provided to the bottom plate 610. The sheet detection sensor includes a reflective photosensor. When the recording sheet 6 is placed on the bottom plate 610, the sheet detection sensor detects the recording sheet 6 through the opening.

As described with reference to FIG. 8, after setting the recording sheet 6 on the sheet setting plate formed by the bottom plate 610 of the first setting portion 61 or on the sheet receiving face 621 of the second setting portion 62, the operator presses a sheet adjusting button provided on the operation display 9 (FIG. 6).

With this action, the controller 400 starts driving in the normal direction of the driving motor 617, which slides the first side fence 611 and the second side fence 612 from the respective home positions toward the centerline L1.

At this time, the distance between the first side fence 611 and the second side fence 612 is greater than the size of the recording sheet 6 placed between the first side fence 611 and the second side fence 612 on the sheet setting plate in the direction B. With this condition, the recording sheet 6 can move freely between the first side fence 611 and the second side fence 612 in the direction B. Accordingly, even when the first side fence 611 and the second side fence 612 start to slide and thereafter contact the recording sheet 6, the side fences 611 and 612 slide smoothly while pressing the recording sheet 6 toward the centerline L1.

Then, when one of the two side fences 611 and 612 moves to a contact position at which the side fence contacts the recording sheet 6, the recording sheet 6 contacts a contact detector supported by the side fence. For example, the first side fence 611 moves to a first contact position that is a position at which the first side fence 611 contacts the recording sheet 6, and contacts a first contact detector 611a that is supported by the first side fence 611 (see FIG. 13). With this action, the first contact detector 611a can detect contact of the recording sheet 6 to the first side fence 611. However, the second side fence 612 has not reached a position at which the second side fence 612 contacts the recording sheet 6.

Then, as the driving of the first side fence 611 continues, the first side fence 611 slides to the second side fence 612 while pressing the recording sheet 6 that remains contacted with the first side fence 611. When the recording sheet 6 that is pressed by the first side fence 611 reaches a second contact position that is a position at which the second side fence 612 contacts the recording sheet 6, and contacts a second contact detector 612a that is supported by the second side fence 612 (see FIG. 11). With this action, the second contact detector 612a can detect contact of the recording sheet 6 to the second side fence 612.

After the first contact detector 611a and the second contact detector 612a thus detect that the recording sheet 6 has contacted the first side fence 611 and the second side fence 612, respectively, the controller 400 stops driving the driving motor 617 to stop sliding of the first side fence 611 and the second side fence 612. At this time, the recording sheet 6 placed unaligned on the bottom plate 610 is adjusted to the centerline L1 in the direction B, which is the direction perpendicular to the sheet conveyance direction on the sheet setting plate of the manual tray 60.

In this image forming apparatus 1, respective single-color toner images are formed on the photoconductors 21Y, 21M, 21C, and 21K using a center-based reference method. The center-based reference method is used to form an image based on the center in a direction of rotational axis of the photoconductor 21, regardless of the size of a recording sheet to be used. In the center-based reference method, it is necessary to convey a recording sheet at the center of the direction of rotation axis of the photoconductor 21 in the image forming unit 4, regardless of the size of the recording sheet. Therefore, the recording sheet is positioned to the centerline L1 on the manual feed tray 60 in FIG. 8. To adjust the position of the recording sheet to the centerline L1 regardless of the size of the recording sheet, the driving mechanism 640 causes not only the first side fence 611 but also the second side fence 612 to be slidably movable on the sheet setting plate and transmits opposite forces to each other along the orthogonal direction with respect to the first side fence 611 and the second side fence 612. Further, to stop the first side fence 611 and the second side fence 612 at the same timing, the driving mechanism 640 that serves as a stopping unit and includes the drive transmission pulley 616 and so forth.

Other than the center-based reference method, a side-based reference method can also be used to determine the reference position of an image. The side-based reference method is used to form an image based on one side in a direction of rotational axis of the photoconductor 21, regardless of the size of a recording sheet to be used. In the side-based reference method, it is necessary to convey a recording sheet at the side of the direction of rotation axis of the photoconductor 21 in the image forming unit 4, regardless of the size of the recording sheet. Therefore, to employ the side-based reference method, instead of a configuration in which the side fences 611 and 612 are slid, it is desirable to a configuration in which orthogonal direction, the second side fence 612 is fixedly disposed along an extension of the reference side position in the direction of rotational axis of the photoconductor 21. Then, only the first side fence 611 is slid to adjust the recording sheet set on the sheet setting plate to the position of the second side fence 612.

In the side-based reference method, one slidably movable side fence is provided and the other slidably movable side fence can be replaced by the tray side wall.

Next, a description is given of a configuration of the image forming apparatus 1 according to an embodiment of the present invention.

Figure 11:
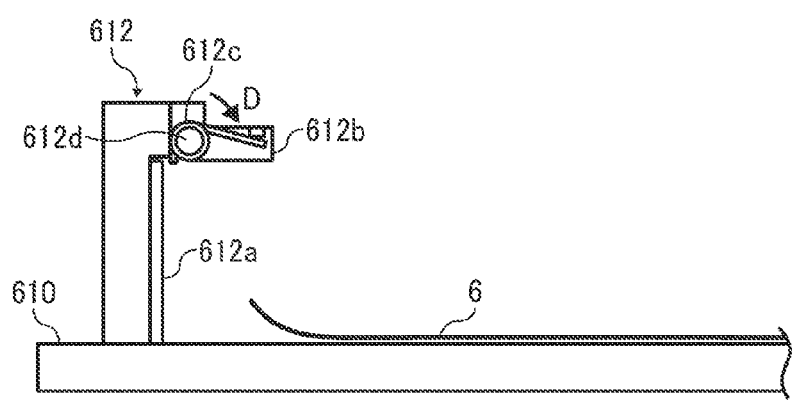
FIG. 11 is a front view illustrating a second side fence of the first sheet setting portion together with a bottom plate.

FIG. 11 is a front view illustrating the second side fence 612 and the bottom plate 610. The second side fence 612 includes a second contact detector 612a, an overhang 612b, a helical torsion spring 612c, and a rotation shaft 612d.

The overhang 612b is mounted on the upper edge of the second side fence 612, extending from a side wall of the second side fence 612 facing the first side fence 611 in a direction substantially perpendicular to an axial direction of the first side fence 611 or toward the first side fence 611, and includes a multipoint pressure sensitive member to detect slight pressure applied to the surface thereof using a known technique. In the image forming apparatus 1 according to this embodiment of the present invention, a distance from the sheet setting plate to the bottom of the overhang 612b is defined as a sheet loadable range of the recording sheet 6.

As described above, the second contact detector 612a is fixedly mounted on the above-described side wall of the second side fence 612 facing the first side fence 611. A contact surface of the second contact detector 612a contacting the recording sheet 6 extends over the entire sheet loadable range of the recording sheet 6 in a sheet loading direction on the sheet setting plate.

The helical torsion spring 612c is wound around the rotation shaft 612d so that the overhang 612b is biased by the helical torsion spring 612c to extend outwardly toward the first side fence 611 at substantially a right angle to the second side fence 612.

Figure 12:
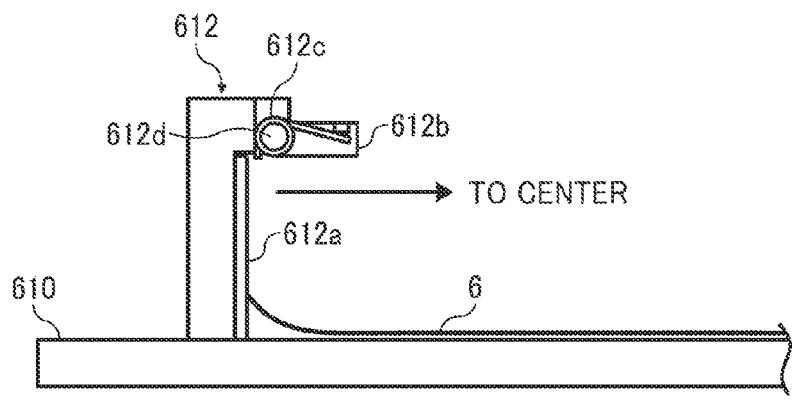
FIG. 12 is a front view illustrating a state in which a recording sheet placed on a sheet setting plate contacts a second sheet contact member held on the second side fence.

With such a configuration, even when an edge of the recording sheet 6 that is placed on the sheet setting plate of the bottom plate 610 is curled as illustrated in FIG. 11, if the second side fence 612 slides to the contact position with the recording sheet 6, the curled end of the recording sheet 6 contacts the second contact detector 612a that extends across the axial direction of the entire sheet loadable area. With this action, contact of the recording sheet 6 with the second side fence 612 can be detected, as illustrated in FIG. 12.

Figure 13:
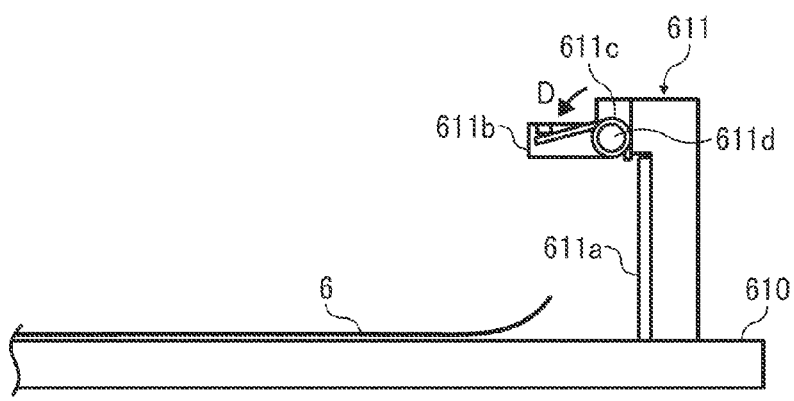
FIG. 13 is a front view illustrating a first side fence of the first sheet setting portion together with the bottom plate.

FIG. 13 is a front view illustrating the first side fence 611 and the bottom plate 610.

Similar to the second side fence 612, the first side fence 611 includes a first contact detector 611a, an overhang 611b, a helical torsion spring 611c, and a rotation shaft 611d.

The first contact detector 611a is mounted on the first side fence 611 facing the second side fence 612 and includes multipoint pressure sensitive member to detect slight pressure applied to the surface thereof using a know technique.

The overhang 611b is disposed at the upper edge of the first side fence 611, extending from a side wall of the first side fence 611 facing the second side fence 612 in a direction substantially perpendicular to an axial direction of the second side fence 612. Similar to the second side fence 612, a range of from the sheet setting plate to the overhang 611b is defined as a sheet loadable range of the recording sheet 6.

The first contact detector 611a is fixedly mounted on the above-described side wall of the first side fence 611 facing the second side fence 612. A contact surface of the first contact detector 611a contacting the recording sheet 6 extends over the entire sheet loadable range of the recording sheet 6 in a sheet loading direction on the sheet setting plate.

The helical torsion spring 611c is wound around the rotation shaft 611d so that the overhang 611b is biased by the helical torsion spring 611c to extend outwardly toward the second side fence 612 at substantially a right angle to the first side fence 611.

The rotation shaft 611d is provided at a portion extending from the side wall of the first side fence 611 toward the second side fence 612.

Figure 14:
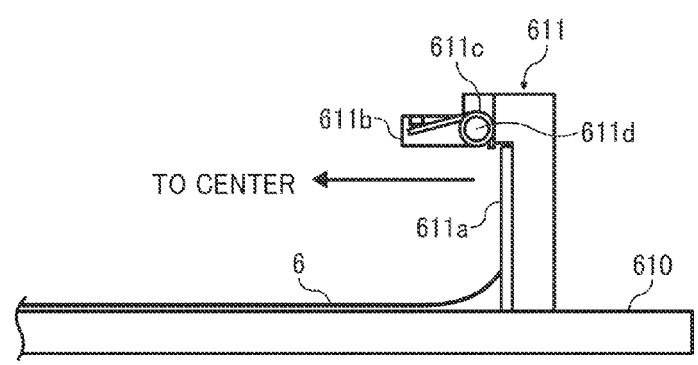
FIG. 14 is a front view illustrating a state in which a first contact detector on the first side fence and the recording sheet set on the sheet setting plate contact each other.

With such a configuration, even when an edge of the recording sheet 6 that is placed on the sheet setting plate of the bottom plate 610 is curled as illustrated in FIG. 13, if the first side fence 611 slides to the contact position with the recording sheet 6, the curled end of the recording sheet 6 contacts the first contact detector 611a that extends across the axial direction of the entire sheet loadable area. With this action, contact of the recording sheet 6 with the first side fence 611 can be detected, as illustrated in FIG. 14.

As described above, even if the edge of the recording sheet 6 is curled, this configuration can cause the recording sheet 6 to contact the first contact detector 611a and the second contact detector 612b, and these sheet contact detectors 611a and 612a detect contact of the recording sheet 6 with the first side fence 611 and contact of the recording sheet 6 with the second side fence 612, thereby stopping the first side fence 611 and the second side fence 612 at respective appropriate positions. Therefore, even if the recording sheet 6 has a curled end, the configuration can perform appropriate sheet adjustment.

Figure 15:
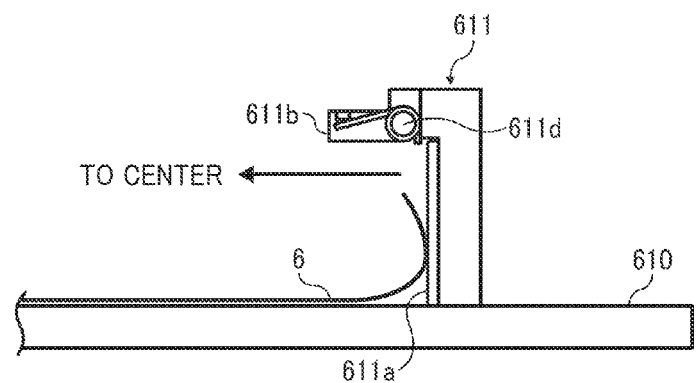
FIG. 15 is a front view illustrating a state in which an excessively curled recording sheet does not put detectable pressure on the first contact detector.
Figure 16:
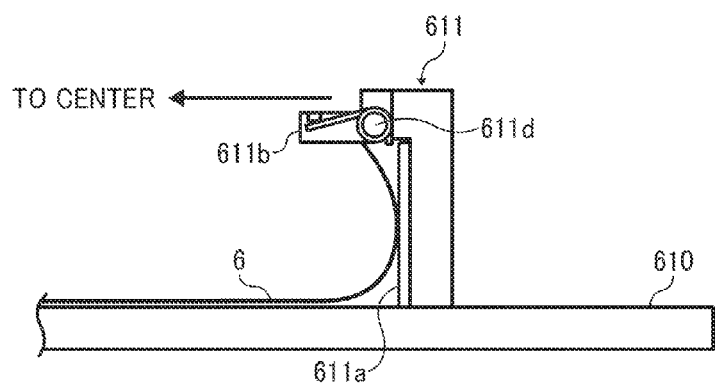
FIG. 16 is a front view illustrating a state in which the excessively curled recording sheet puts detectable pressure on the first contact detector due to abutment of the edge of the excessively curled recording sheet against an overhang of the first side fence.

If the recording sheet 6 has an excessively curled end, the curled end does not contact the first contact detector 611a, as illustrated in FIG. 15, and therefore it is likely that detectable pressure is not put on the first contact detector 611b. Accordingly, even if the driving of the side fences 611 and 612 continues, excessive movement of the side fences 611 and 612 can be stopped promptly because if the first side fence 611 slides excessively, the edge of the recording sheet 6 warps upon contact with the first contact detector 611a, resulting in abutment of the curled end of the recording sheet 6 against the overhang 612b, as illustrated in FIG. 16. With this action, detectable pressure is put on the first contact detector 611a, and contact of the recording sheet 6 with the first side fence 611 is detected.

Figure 17:
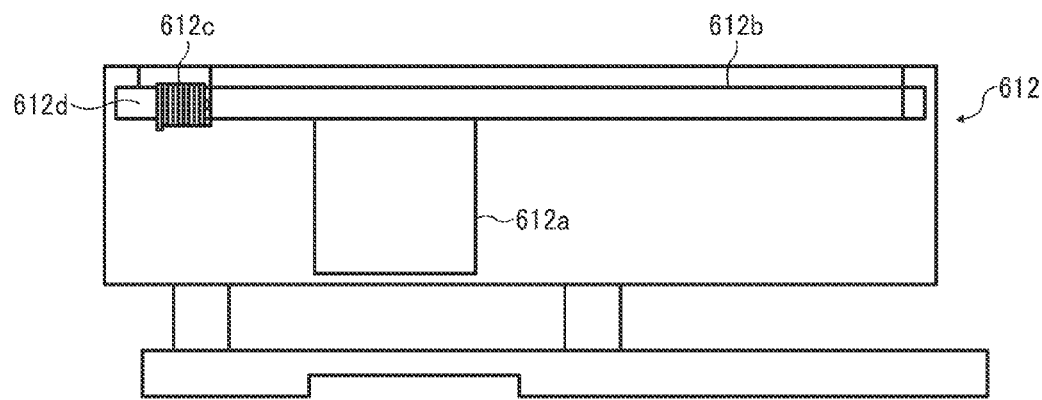
FIG. 17 is a front view illustrating the second side fence viewed from the center of the sheet setting plate.

As illustrated in FIG. 11, the overhang 612b is rotatable about the rotation shaft 612d in a direction indicated by arrow "D". As previously described, the overhang 612b is biased by the helical torsion spring 612c wound around the rotation shaft 612d as illustrated in FIG. 17, and therefore is fixedly located at substantially a right angle to the second side fence 612 as illustrated in FIG. 11.

Further, as illustrated in FIG. 13, the overhang 611b is rotatable about the rotation shaft 611d in a direction indicated by arrow "D". As previously described, the overhang 611b is biased by the helical torsion spring 611c wound around the rotation shaft 611d as illustrated in FIG. 17, and therefore is fixedly located at substantially right angle to the side wall of the first side fence 611 as illustrated in FIG. 13.

Figure 18:
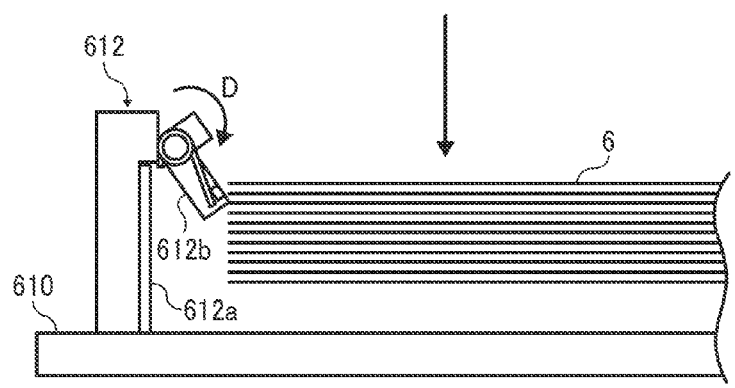
FIG. 18 is a front view illustrating the second side fence with the overhang sloped and a stack of recording sheets.

When a sheet stack of multiple recording sheets 6 is placed on the sheet setting plate, an operator rotates the overhang 612b about the rotation shaft 612d to the sheet setting plate while pressing the sheet stack against the overhang 612b, as illustrated in FIG. 18, to cause the overhang 612b to retreat from the contact position with the sheet stack. It is to be noted that the first side fence 611 has the same function as the second side fence 612 as illustrated in FIG. 18. Specifically, the operator rotates the overhang 611b about the rotation shaft 611d to the sheet setting plate while pressing the sheet stack against the overhang 611b to cause the overhang 611b to retreat from the contact position with the sheet stack. With the above-described actions of the first side fence 611 and the second side fence 612, the operator can facilitate loading of the sheet stack on the sheet setting plate of the bottom plate 610 easily without being annoyed by warping the sheet stack to avoid the overhang 611b and 612b before loading the sheet stack.

In a case in which the first side fence 611 and the second side fence 612 do not include the overhang 611b and 612b, respectively, a mark is put at each position for the maximum sheet loadable height on the side wall of the first side fence 611 and/or the side of the second side fence 612 so that the operator can recognize that a range from the sheet setting plate to the mark is a sheet loadable range. The mark can be a projection, a notch, or any shape that can be formed integrally with the side fence, or can be a seal put on the side wall of the side fence.

As described above, this embodiment of the present invention provides the configuration in which the first contact detector 611a and the second contact detector 612a have the contact surface with the recording sheet 6 extending over the entire sheet loadable range. With this configuration, even with a curled end, the recording sheet 6 can be adjusted appropriately.

Figure 19:
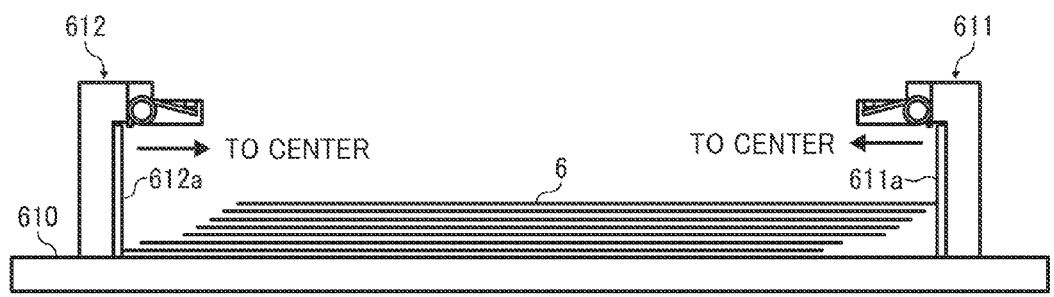
FIG. 19 is a front view illustrating a first example showing that a stack of unaligned recording sheets contacts the two side fences at positions short of their appropriate positions.

However, it is likely that, when a sheet stack of unaligned recording sheets 6 is placed on the sheet setting plate, if the recording sheets 6 remain unaligned, proper sheet adjustment cannot be performed. For example, as illustrated in FIG. 19, if a sheet stack is placed on the sheet setting plate with the recording sheets 6 unaligned, one of the unaligned recording sheets 6 can contact the first contact detector 611a before the first side fence 611 reaches a position corresponding to one side of the width of the recording sheet 6 and another one of the unaligned recording sheets 6 can contact the second contact detector 612a before the second side fence 612 reaches a position corresponding to the opposite side of the width of the recording sheet 6. In response to the erroneous detections, the first side fence 611 and the second side fence 612 stop moving before reaching respective positions corresponding to the width of the recording sheet 6.

Figure 20:
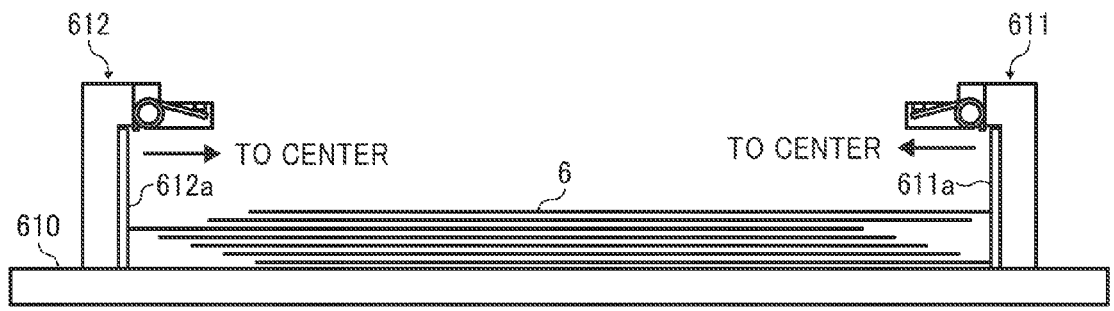
FIG. 20 is a front view illustrating a second example showing the same state as FIG. 19.

In addition to the case with the recording sheets 6 unaligned in the same direction as illustrated in FIG. 19, a sheet stack with the recording sheets 6 unaligned in different directions may be placed on the sheet setting plate as illustrated in FIG. 20. The sheet stack of unaligned recording sheets 7 shown in FIG. 20 can cause the same erroneous operations as the case described with reference to FIG. 19, resulting in that the first side fence 611 and the second side fence 612 stopping short of their respective appropriate positions.

To avoid the above-described erroneous detections results, the image forming apparatus 1 according to this embodiment employs multipoint pressure sensitive members for the first contact detector 611a and the second contact detector 612a. The multipoint pressure sensitive member can detect changes of pressure at different points on a surface individually. For example, MicroNavSTRIP (registered trademark) manufactured by Interlink Electronics Inc. is applicable to this type of a multipoint pressure sensitive member.

Figure 21:
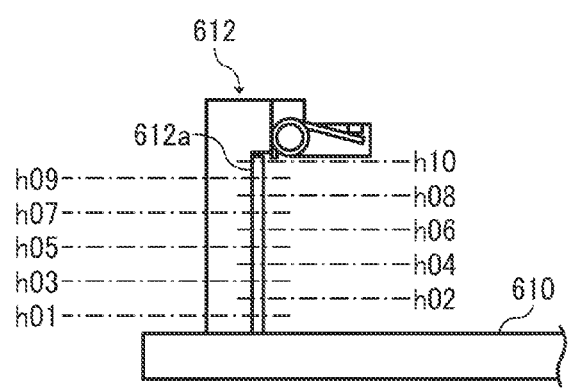
FIG. 21 is a front view illustrating respective heights of sheet detection for multiple detectors of the second contact detector to detect the recording sheet.

As illustrated in FIG. 21, the second contact detector 612a includes ten detecting points disposed at ten different heights h01 through h10 in the sheet loading direction to detect different changes of pressure individually. Similarly, the first contact detector 611a also includes ten detecting points disposed at ten different heights h01 through h10 in the sheet loading direction to perform the same detection as the second contact detector 612a.

Figure 22:
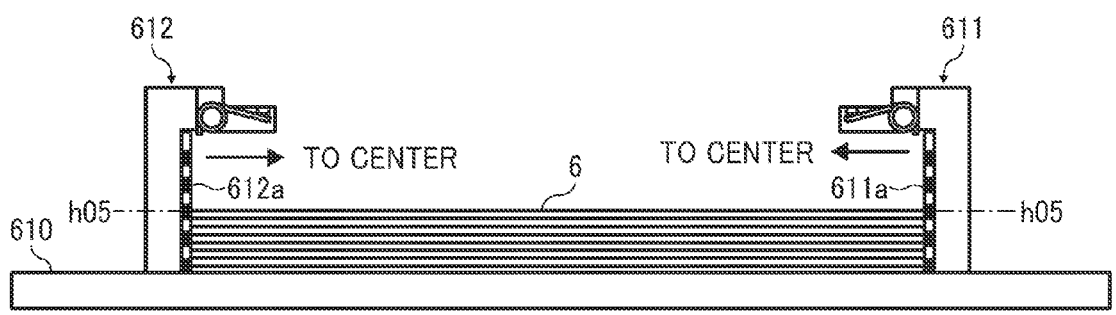
FIG. 22 is a front view illustrating a state in which the two side fences stop at the appropriate positions with respect to the width of the stack of recording sheets.

The recording sheets 6 are positioned as illustrated in FIG. 22 when the first side fence 611 and the second side fence 612 slide to the respective appropriate positions that correspond to the width of the recording sheet 6. The respective detecting points on the first contact detector 611a and the second contact detector 612a at the height (thickness) of the top of the sheet stack of the recording sheets 6 (for example, the height h05 in FIG. 22) contact and detect the recording sheets 6. In addition, other detecting points located below the height h5, e.g., the detecting points at the heights h01 through h04, contact, and detect the recording sheets 6. As a matter of convenience, of the detecting points on the first contact detector 611a and the second contact detector 612a in FIG. 22, the detecting points at the heights h01, 03, 05, 07, 09 are illustrated in black.

In the image forming apparatus 1 according to this embodiment, the operator can select between an individual move and a sheet stack mode for adjusting the recording sheet 6. The individual mode can be effectively used when a small number of recording sheets 6 (for example, three sheets) are set on the sheet setting plate. The sheet stack mode is suitable when a stack of recording sheets 6 is set on the sheet setting plate. The operator selects one of the individual mode and the sheet stack mode via the operation panel 9 of the image forming apparatus 1 (see FIG. 6) according to the number of recording sheets 6 to be placed on the sheet setting plate.

When a small number of recording sheets 6 are set on the sheet setting plate, if the edge of any recording sheet 6 is curled, both edges in the orthogonal direction of the recording sheet 6 are generally lifted up according to the curled end. Therefore, when the individual mode is selected, even if the detected contact height of the first contact detector 611a and the detected contact height of the second contact detector 612a are different, the driving unit stops movement of the first side fence 611 and the second side fence 612 at a time when contact of the recording sheet 6 with at least one of the first contact detector 611a and the second contact detector 612a is detected. By so doing, even if the edge of the recording sheet 6 is curled, the first side fence 611 and the second side fence 612 are stopped at respective appropriate positions to adjust the position of the recording sheet 6 properly.

By contrast, when a sheet stack having more recording sheets 6 than the above-described small number of the recording sheets 6, even if some recording sheets 6 are curled at their edges, the sheet stack is loaded by the operator in a state in which the highest portion of the center of the sheet stack is faced upward in a direction vertical to the sheet setting plate, thereby correcting the curled end of the recording sheets 6 by their own weight. Therefore, it is not necessary to consider the lift-up at both edges of the recording sheet 6 due to curling. Instead of consideration of the curled ends of the recording sheets 6, the individual recording sheets 6 may be displaced or unaligned as illustrated in FIG. 19 or FIG. 20.

Therefore, when the sheet stack mode is selected, the driving unit stops movement of the first side fence 611 and the second side fence 612 after the first contact detector 611a and the second contact detector 612a complete the following two conditions. Firstly, of the multiple detecting points to detect contact of the recording sheet 6, the highest detecting point of the first contact detector 611a and the highest detecting point of the second contact detector 612a are equal to each other. (Hereinafter the height of the highest detecting point is referred to as "the maximum detecting height".) Secondly, all detecting points located below the maximum detecting heights of the first contact detector 611a and the second contact detector 612a detect contact with the recording sheets 6. Since the first side fence 611 and the second side fence 612 stop according to the above-described conditions, even if the individual recording sheets 6 of the sheet slack are displaced or remain unaligned, the first side fence 611 and the second side fence 612 are stopped at respective appropriate positions to adjust the position of the recording sheet 6 properly.

As illustrated in FIG. 5, the image forming apparatus 1 includes not only the sheet positioning device 630 in the manual feed tray 60 but also sheet positioning devices in the sheet feeding cassette 41 of the image forming unit 4, the sheet discharging tray 80 of the image forming unit 4, the document processing tray 200 of the scanner 3, and the duplex transit tray 209b of the scanner 3. The configurations of these sheet positioning devices are same as the sheet positioning device 630 of the manual feed tray 60.

Figure 23:
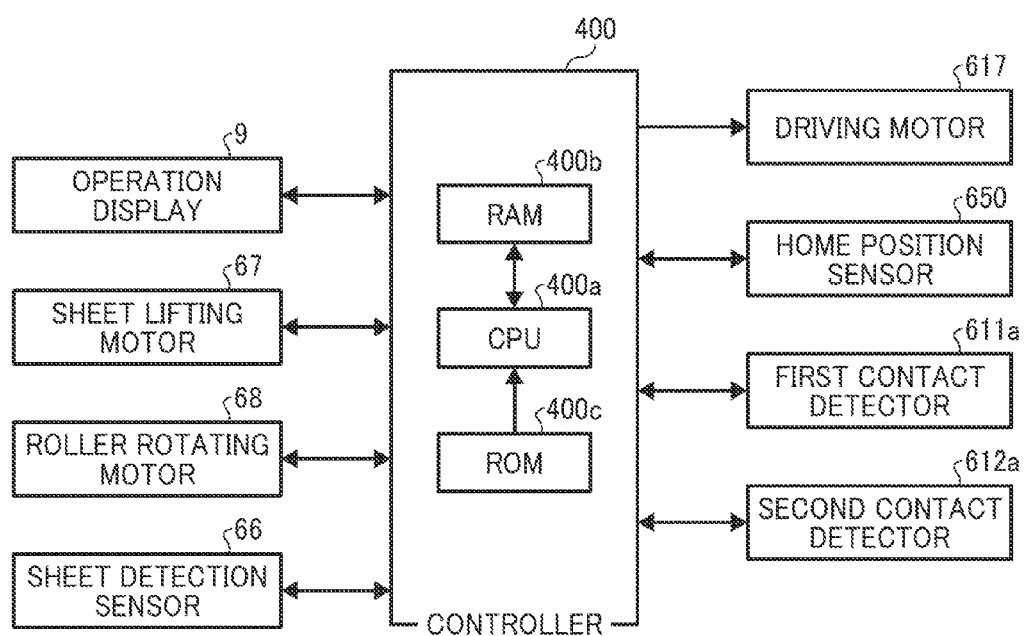
FIG. 23 is a functional block diagram of the image forming apparatus.

FIG. 23 is a block diagram illustrating a part of electrical circuitry of the image forming apparatus 1 according to this exemplary embodiment of the present invention.

As illustrated in FIG. 23, the controller 400 serves as a driving controller to control driving of various units and components included in the image forming apparatus 1. The controller 400 is connected to various units and components, for example, related to recording sheet adjustment on the manual feed tray 60, as illustrated in FIG. 23. Specifically, the controller 400 is connected to the driving motor 617, the home position sensor 650, the sheet detection sensor 66, and the operation display 9, which are previously described. The controller 400 is also connected to a sheet lifting motor 67, a roller swing motor 68, the first contact detector 611a, and the second contact detector 612a.

The sheet detection sensor 66 detects the recording sheet 6 placed on the bottom plate 610 through the opening of the bottom plate 610 illustrated in FIG. 8. The sheet lifting motor 67 lifts or moves the manual feed roller 601 illustrated in FIG. 5 in the vertical direction with respect to the manual feed tray 60. The roller swing motor 68 causes the sheet holding roller 605 to swing with the swing arm 604.

Figure 24:
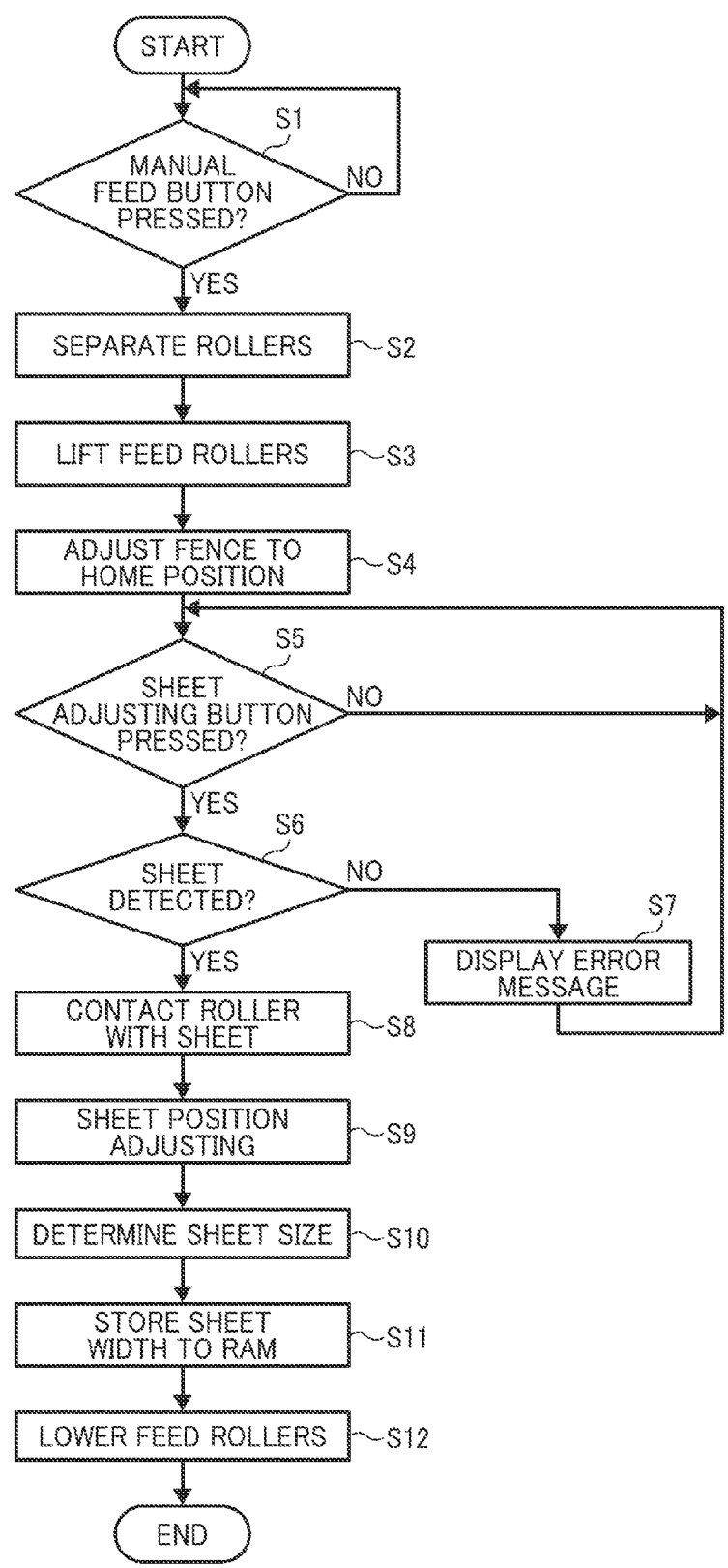
FIG. 24 is a flowchart showing control performed by a controller of the image forming apparatus.

FIG. 24 is a flowchart, showing each step of the sheet adjusting operation performed, by the controller 400.

In step S1, the controller 400 determines whether or not the operator has pressed the manual sheet feeding start button provided on the operation display 9.

When the operator has not yet pressed the manual sheet feeding start button, which is "NO" in step S1, the controller 400 repeats the procedure until the manual sheet feeding start button is pressed.

When the operator presses the manual sheet feeding start button, which is "YES" in step S1, the controller 400 performs operations in steps S2 through S4 sequentially.

In step S2, the controller 400 performs a roller separating operation. Specifically, the controller 400 causes the roller swing motor 68 to rotate in a reverse direction until a predetermined time elapses so as to move up the sheet holding roller 605 to a position to widely separate the sheet holding roller 605 from the sheet setting plate of the manual feed tray 60.

In step S3, the controller 400 performs a feed roller lifting operation. Specifically, the controller 400 causes the sheet lifting motor 67 to rotate in a reverse direction until a predetermined time elapses so as to move up the manual feed roller 601 to a position where the manual feed roller 601 does not contact the sheet stack placed on the sheet setting plate.

In step S4, the controller 400 performs a fence position detecting operation. Specifically, the controller 400 causes the driving motor 617 to rotate in a reverse direction until the home position sensor 650 detects the first side fence 611.

According to the operations in steps S2 through S4 performed by the controller 400, the first side fence 611 and the second side fence 612 slide to the respective home positions.

After step S4, the controller 400 stands by to determine whether or not the operator has pressed the sheet adjusting button provided on the operation display 9.

When the operator has not yet pressed the sheet adjusting button, which is "NO" in step S5, the controller 400 repeats the procedure until the sheet adjusting button is pressed.

When the operator has pressed the sheet adjusting button, which is "YES" in step S5, the controller 400 then determines whether or not the sheet detection sensor 66 has detected the recording sheet 6 set on the sheet setting plate in step S6.

When the sheet detection sensor 66 has not yet detected the recording sheet 6, which is "NO" in step S6, the controller 400 displays an error message on the operation display 9 to indicate that the recording sheet 6 is not set in step S7 and returns to step S5 to loop the procedure until the sheet adjusting button is pressed.

When the sheet detection sensor 66 has detected the recording sheet 6, which is "YES" in step S6, the controller 400 performs operations in steps S8 through S10 sequentially.

In step S8, the controller 400 performs a roller contacting operation. Specifically, the controller 400 causes the roller swing motor 68 to rotate in a normal direction until a predetermined time so as to contact the sheet holding roller 605 onto the recording sheet 6 on the manual feed tray 60 with a relatively small contact pressure to further curve the recording sheet 6.

In step S9, the controller 400 performs a position adjusting operation. Specifically, the controller 400 causes the side fences 611 and 612 to slide toward the centerline L1 to adjust the position of the recording sheet 6.

In step S10, the controller 400 performs a sheet size specifying operation. Specifically, the controller 400 specifies the sheet width size of the recording sheet 6 set on the manual feed tray 60 based on the total number of pulses obtained by counting the number of pulse signals. Details of the operation in step S9 have been described above.

In the position adjusting operation, after starting driving the driving motor 617, the controller 400 determines whether the above-described few sheet mode or the sheet stack mode is selected.

In a case in which the few sheet mode is selected, when at least one of the first contact detectors (Vila and at least one of the second contact detectors 612a have detected contact with the recording sheet 6, the controller 400 stops driving the driving motor 617.

By contrast in a case in which the sheet stack mode is selected, after the above-described two conditions are completed, the controller 400 stops driving the driving motor 617. With this action, even if sheets in the stack of recording sheets are not aligned to the correct position, the controller 400 can stop sliding of the first side fence 611 and the second side fence 612 at an appropriate position to align the sheet stack properly.

After step S10, the controller 400 stores the value to the RAM 400b in step S11, and goes to step S12.

In step S12, the controller 400 causes the sheet lifting motor 67 to rotate in a normal direction until a predetermined time elapses to move down the manual feed roller 601 to a position where the manual feed roller 601 can contact the uppermost recording sheet of the sheet stack of recording sheets placed on the sheet setting plate.

Figure 25:
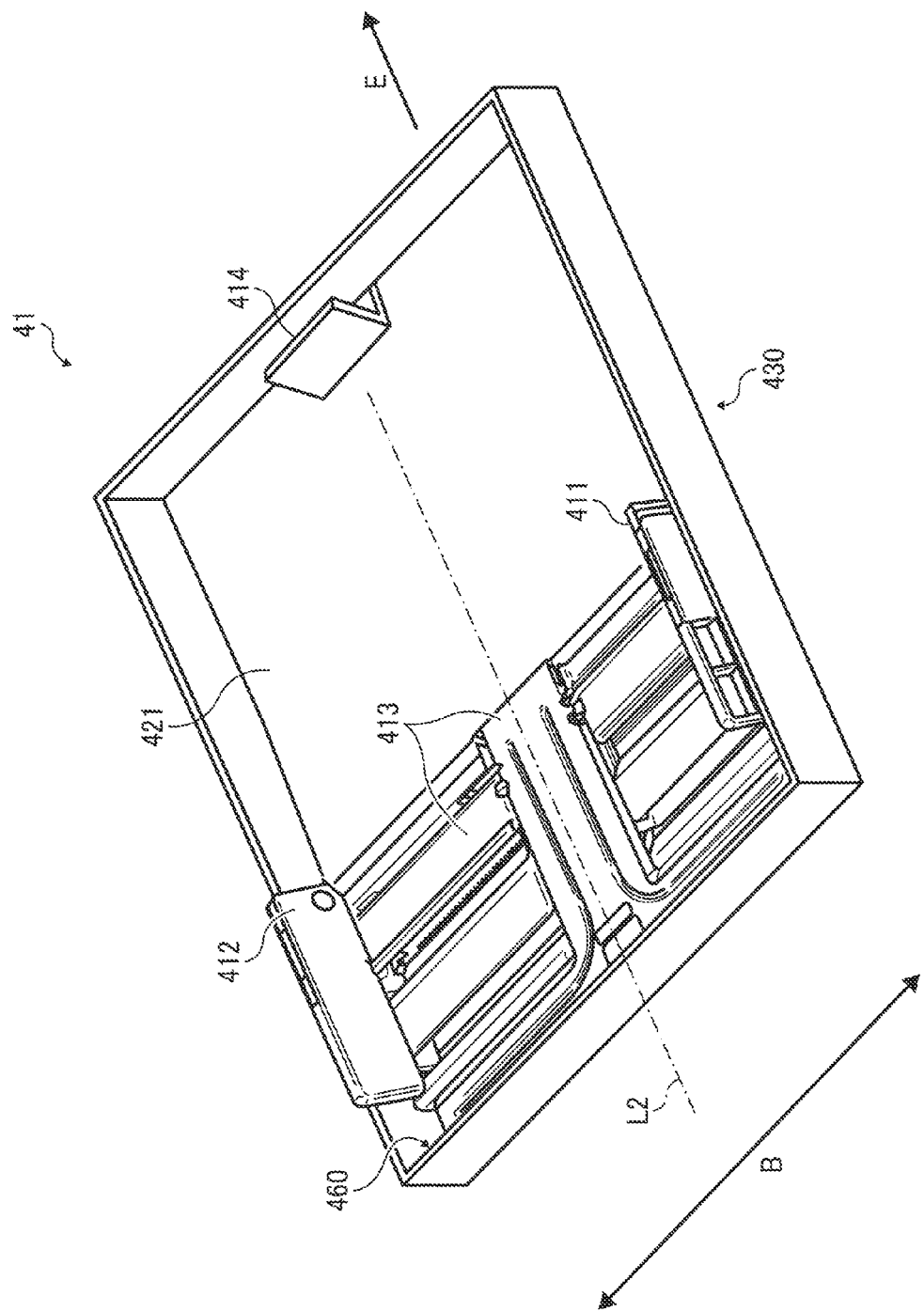
FIG. 25 is an enlarged perspective view illustrating a sheet feeding cassette that is inserted in or removed from an image forming device of the image forming apparatus.

FIG. 25 is an enlarged view illustrating the sheet feeding cassette 41.

As illustrated in FIG. 25, the sheet feeding cassette 41 serves as a sheet holding receptacle and includes a first side fence 411, a second side fence 412, a bottom plate 413, and an end fence 414.

The bottom plate 413 serves as a leading end portion sheet setting plate in the entire area of the sheet setting plate 421 on which the recording sheet 6 is set. The first side fence 411 and the second side fence 412 are disposed facing each other to slide on a surface of the bottom plate 413 in the orthogonal direction, which is indicated by arrow B in FIG. 25. The end fence 414 regulates the position of the leading edge of the recording sheet 6 in the sheet feeding cassette 41.

A broken line L2 illustrated in FIG. 25 indicates a centerline in the orthogonal direction B. The centerline L2 extends to the same position as the centerline L1 of the manual feed tray 60 and the centerline in the rotation axis of the photoconductor 21 in the direction B.

The sheet feeding cassette 41 illustrated in FIG. 25 further includes a sheet positioning device 430 including various components and units that are same as the sheet positioning device 630 of the manual feed tray 60. For example, the sheet positioning device 430 of the sheet feeding cassette 41 is disposed under the bottom plate 413, and includes a driving mechanism 440 that includes a drive transmission pulley 416, a first rack gear 413, a second rack gear 414, a linking pinion gear 415, the driving motor 617, a timing belt 418, the home position sensor 450, a rotation detecting sensor 419, and the sheet detection sensor 66, as shown in FIGS. 9, 10, and 23.

Using the same principle as the sheet positioning device 630 of the manual feed tray 60, the first side fence 411 and the second side fence 412 slide to adjust the recording sheet 6 interposed between the side fences 411 and 412 to the centerline L2. The driving motor 617 and various sensors mounted on the sheet feeding cassette 41 are connected at an electric contact with the controller 400 in the housing of the image forming unit 4 when the sheet feeding cassette 41 is set to a predetermined position in the image forming unit 4.

As previously depicted in FIG. 5, the sheet feed roller 42 contacts the uppermost, recording sheet of the sheet stack contained in the sheet feeding cassette 41. The sheet feed roller 42 is supported not in the sheet feeding cassette 41 but in the housing of the image forming unit 4. When the sheet feeding cassette 41 is set in the housing of the image forming unit 4 and the operator presses a sheet supply button provided on the operation display 9, the controller 400 causes the sheet lifting motor 67 in the housing of the image forming unit 4 to rotate in reverse until a predetermined time so as to widely separate the sheet feed roller 42 from the sheet feeding cassette 41.

Further, the controller 400 causes each driving motor mounted on the sheet feeding cassettes 41 to rotate in a reverse direction so as to move the side fences 411 and 412 of each sheet feeding cassette 41 to respective home positions. After pulling out the sheet feeding cassette 41 from the housing of the image forming unit 4 under this condition, the operator sets a sheet stack of recording sheets onto the bottom plate 413 of the sheet feeding cassette 41, then pushes the sheet feeding cassette 41 into the housing of the image forming unit 4, and presses an in-cassette sheet adjusting button. In response to the request issued by the operator, the controller 400 causes the driving motor 417 of the sheet feeding cassette 41 to rotate in a normal direction to perform the sheet adjusting operation and the pulse counting operation same as those performed in the manual feed tray 60. According to the above-described operations, the sheet stack of recording sheets 6 set on the sheet feeding cassette 41 can be adjusted to the position of the centerline L2.

Instead of the sheet adjusting operation in which the driving power of the driving motor 617 causes the side fences 411 and 412 to slide to automatically adjust the position of the recording sheet in the direction B, the end fence 414 is used to adjust the position of the recording sheet 6 by slidably moving in the sheet conveyance direction that is a direction indicated by arrow E or an direction opposite the direction E, as illustrated in FIG. 25. This sheet positioning device used for adjusting the recording sheet 6 with the end fence 414 has the same configuration as the sheet positioning device 430 including the side fences 411 and 412 of the sheet feeding cassette 41 according to this exemplary embodiment of the present invention.

Specifically, the sheet positioning device 430 includes the end fence 414, an inner wall 460 of the sheet feeding cassette 41, and a rack gear (not shown). The end fence 414 serves as a trailing end fence and slides along the rack gear toward the inner wall 460 of the sheet feeding cassette 41. The inner wall 460 serves as a leading end fence against which the leading edge of the recording sheet 6 abuts.

The end fence 414 serving as a trailing end fence contacts the trailing edge of the recording sheet 6 set on the sheet feeding cassette 41 and slides toward the leading edge thereof so that the recording sheet 6 can be slid toward the inner wall 460 of the sheet feeding cassette 41. The moment the leading edge of the recording sheet 6 abuts against the inner wall 460 of the sheet feeding cassette 41, the controller 400 cuts off the transmission of the driving power to the end fence 414, and the end fence 414 stops, thereby adjusting the position of the recording sheet 6 to the position at which the leading edge of the recording sheet 6 contacts the inner wall 460 of the sheet feeding cassette 41. In this case, it is desirable that the bottom plate 413 of the sheet feeding cassette 41 is bent or angled to form a curved portion in the center area of the recording sheet 6 in the orthogonal direction B so that the end fence 414 can contact the curved portion of the recording sheet 6.

As illustrated in FIG. 7, in the image forming apparatus 1 according to this exemplary embodiment of the present invention, the document processing tray 200 that serves as a sheet holding receptacle of the ADF 2 also includes a sheet positioning device 230 that has the same configuration as the sheet positioning device 630 of the manual feed tray 60.

The sheet positioning device 230 includes a first side fence 211 and a second side fence 212 that can slide on a tray upper surface 200a that serves as a sheet setting plate in the orthogonal direction, which is a direction perpendicular to the surface of the drawing sheet.

The sheet positioning device 230 of the ADF 2 further includes various components and unit same as the sheet positioning device 630 of the manual feed tray 60, which are a driving mechanism 240 that includes a drive transmission pulley 216, a first rack gear 213, a second rack gear 214, a linking pinion gear 215, the driving motor 617, a timing belt 218, a home position sensor 250, a rotation detecting sensor 219, and the sheet detection sensor 66, as shown in FIGS. 9, 10, and 23.

Using the same principle as the sheet positioning device 630 of the manual feed tray 60, the first side fence 211 and the second side fence 212 slide to adjust the original document sheet P set on the tray upper surface 200a to the centerline of the document processing tray 200.

The ADF 2 causes the sheet feed roller 202 that feeds the original document sheet P from the tray upper surface 200a to be widely separated from the tray upper surface 200a. At the same time, the ADF 2 stands by for instructions issued by the operator, with the side fences 211 and 212 on the tray upper surface 200a resting at the respective home positions. When the operator sets the original document sheet P on the tray upper surface 200a and presses the copy start button 900, the side fences 211 and 212 are slid to center the position of the original document sheet P on the document processing tray 200. Then, the controller 400 moves down the sheet feed roller 202 to contact the original document sheet P, and starts feeding the original document sheet P.

In the image forming apparatus 1 according to this exemplary embodiment of the present invention, the duplex transit tray 209b, which serves as a sheet holding receptacle of the ADF 2, also includes a sheet positioning device 280 that has the same configuration as the manual feed tray 60. For example, the sheet positioning device 280 of the duplex transit tray 209b is disposed under the bottom plate 280 and includes a drive limiting mechanism 286, a first rack gear 283, a second rack gear 284, a linking pinion gear 285, and a timing belt 288, which are components of a driving mechanism 290, and the driving motor 617, a home position sensor 220, a rotation detecting sensor 289, the sheet detection sensor 66 and so forth, as illustrated in FIGS. 9, 10, and 23. The duplex transit tray 209b further includes a first transit side fence 281 and a second transit side fence 282 that are disposed slidably movable to an orthogonal direction that is perpendicular to the sheet conveyance direction on the sheet setting plate of the duplex transit tray 209b. The first side fence 281 and a second side fence 282 that can slide on a sheet setting plate in the orthogonal direction. The first relay side fence 281 and the second relay side fence 282 generally stand by at their home positions.

After an image on a first face of the original document sheet P has passed over the second contact glass 301 and read by the scanner 3, the original document sheet P is reversed to pass over the second contact glass 301 again according to the following operation.

The controller 400 causes the free end of the switching claw 207 to be lowered from the position shown in FIG. 3, and causes the pair of relay rollers 210 to rotate in a normal direction for a predetermined period of time. This conveys the original document sheet P that has passed through the conveyance nip formed between the pair of second post-scanning sheet conveyance rollers 206 to the duplex transit tray 209*b*.

Then, with the pair of relay rollers 210 remaining unrotated, an upper roller of the pair of relay rollers 210 is separated from a lower roller thereof. This releases the original document sheet P from the conveyance nip of the pair of relay rollers 210 between which the original document sheet P has been sandwiched. With this condition, the first relay side fence 281 and the second relay side fence 282 slide toward the centerline on the duplex transit tray 209*b* to adjust the position of the original document sheet P on the duplex transit tray 209*b*.

Then, after the upper roller is lowered enough to form the conveyance nip between the upper roller and the lower roller of the pair of relay rollers 210, the controller 400 starts the pair of relay rollers 210 to rotate in reverse to resume the feeding of the original document sheet P.

Further, in the image forming apparatus 1 according to this exemplary embodiment of the present invention, the duplex transit tray 88 that serves as a sheet holding receptacle of the reverse conveyance unit 89 also includes a sheet positioning device 880 that has the same configuration as the manual feed tray 60. The duplex transit tray 88 includes a first transit side fence 881 and a second transit side fence 882 that are disposed slidably movable to an orthogonal direction that is perpendicular to the sheet conveyance direction on the sheet setting plate of the duplex transit tray 88. The first transit side fence 881 and the second transit side fence 882 generally stand by at respective home positions.

The sheet positioning device 880 of the duplex transit tray 88 further includes various components and unit same as the sheet positioning device 630 of the manual feed tray 60, which are a driving mechanism 890 that includes a drive transmission pulley 886, a first rack gear 883, a second rack gear 884, a linking pinion gear 885, the driving motor 617, a timing belt 888, a home position sensor 850, a rotation detecting sensor 889, and the sheet detection sensor 66, as shown in FIGS. 9, 10, and 23.

The controller 400 causes the sheet feed roller 42 of the duplex transit tray 88 to be widely separated from the sheet setting plate thereof.

In the duplex printing mode, when the recording sheets 6 each having an image on a first face thereof are stored in the duplex transit tray 88, the controller 400 cases the first relay side fence 881 and the second relay side fence 882 of the duplex transit tray 88 to slide toward the centerline in the orthogonal direction so as to adjust, the position of the recording sheets 6 to the centerline of the duplex transit tray 88. Then, the controller 400 causes the sheet feed roller 42 of the duplex transit tray 88 to move down to contact the recording sheets 6 temporarily stacked in the duplex transit tray 88 and rotate so as to resume the conveyance of the recording sheets 6 from the duplex transit tray 88 to the pair of registration rollers 45. By adjusting the position of the recording sheets 6 before resuming the conveyance thereof, paper jams and skews in conveyance can be prevented.

Further, in the image forming apparatus 1 according to this exemplary embodiment of the present invention, the sheet discharging tray 80 that serves as a sheet holding receptacle of the image forming unit 4 also includes a sheet positioning device 830 that has the same configuration as the manual feed tray 60. For example, the sheet positioning device 830 of the sheet discharging tray 80 includes a drive limiting mechanism 816, a first rack gear 813, a second rack gear 814, a linking pinion gear 815, and a timing belt 818, which are components of a driving mechanism 840, and the driving motor 617, a home position sensor 820, a rotation detecting sensor 819, a sheet detection sensor 66 and so forth, as illustrated in FIGS. 9, 10, and 23. The sheet discharging tray 80 further includes a first discharging side fence 811 and a second discharging side fence 812 that are disposed slidably movable to an orthogonal direction that is perpendicular to the sheet conveyance direction on the sheet setting plate of the sheet discharging tray 80. The first discharging side fence 811 and the second discharging side 812 fence generally stand by at respective home positions.

The controller 400 causes the sheet feed roller 42 of the duplex transit tray 88 to be widely separated from the sheet setting plate thereof. When the image forming unit 4 completes serial printing jobs and the recording sheets 6 processed during the serial printing jobs are stacked on the sheet discharging tray 80, the first discharging side fence 811 and the second discharging side fence 812 are slid toward the centerline in the orthogonal direction so as to adjust the position of the recording sheets 6 stacked on the sheet discharging tray 80.

A post-processing apparatus can be connected to the sheet discharging tray 80. The post-processing apparatus performs at least one of the following operations, which are a stapling operation to staple or bind the recording sheets 6 each having an image formed by the image forming unit 4, a grouping operation to classify the recording sheets 6 having an image thereon to appropriate destinations, an aligning operation to align the leading edges of the recording sheets 6 and correct skew of the recording sheets 6, and a sorting operation to sort multiple original document sheets P in the order of pages.

The above-described post-processing apparatus can also include a sheet positioning device according to this exemplary embodiment of the present invention. For example, the position of multiple recording sheets 6 can be adjusted before binding in the stapling operation. By so doing, the multiple recording sheets 6 can be bound successfully without sheet displacement with respect to the centerline. Alternatively, the position of multiple stacks of the bound multiple recording sheets 6 can be adjusted. By so doing, the multiple stacks of the bound recording sheets 6 can be stacked without misalignment of the stacks thereof.

Next, descriptions are given of a modification of the image forming apparatus 1 according to this exemplary embodiment of the present invention. Unless otherwise noted, the elements or components of the modifications of the image forming apparatus 1 are same in structure and functions to the elements or components of the image forming apparatus 1 according to the exemplary embodiment of the present invention. Elements or components of the image forming apparatus 1 according to the following modifications may be denoted by the same reference numerals as those of the image forming apparatus 1 according to the exemplary embodiment and the descriptions thereof are omitted or summarized.

Figure 26:
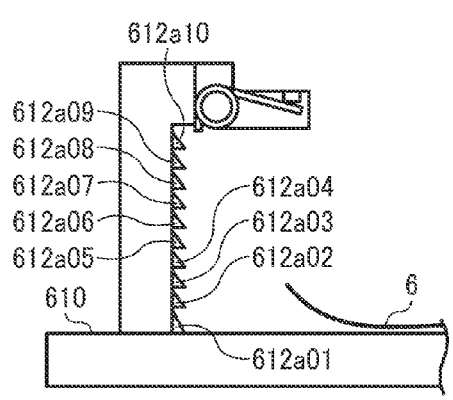
FIG. 26 is an enlarged front view illustrating the second side fence and the bottom plate included in the image forming apparatus according to a modification of the present invention.

FIG. 26 is an enlarged front view illustrating the second side fence 612 and the bottom plate 610 of the image forming apparatus 1 according to a modification of the present invention.

Figure 27:
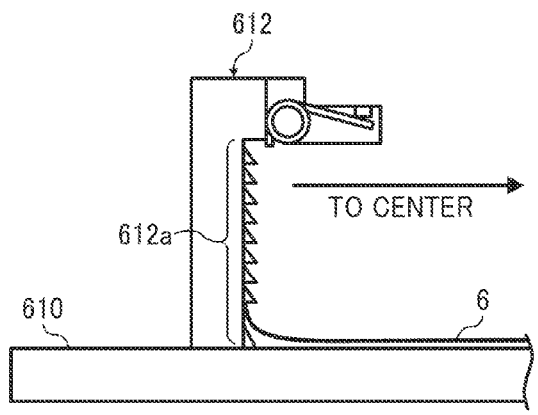
FIG. 27 is an enlarged front view illustrating a state in which the recording sheet contacts the second contact detector of the second side fence.

The second contact detector 612*a* of the second side fence 612 of FIG. 26 includes ten movable switches aligned in the sheet loading direction, specifically a first movable switch 612*a*01, a second movable switch 612*a*02, a third movable switch 612*a*03, . . . a tenth movable switch 612*a*10. Each of the movable switches 612*a*01 through 612*a* 10 can detect contact with the recording sheet 6 by moving individually. The movable switches 612*a*01 through 612*a* 10 are located in the sheet loading direction closely. However, since each of the movable switches 612*a*01 through 612*a*10 includes a taper in a shape of a substantially right triangle, these movable switches 612a01 through 612a10 form an uneven surface in the sheet loading direction. Therefore, even if the recording sheet 6 has an excessively curled end, as the recording sheet 6 contacts the second side fence 612, the excessively curled end of the recording sheet 6 is caught at the convex portion, e.g., the lowest end of one of the movable switches 612a10 through 612a10, as illustrated in FIG. 27. Therefore, the recording sheet 6 is stopped at the portion, avoiding slippage on the side wall of the second side fence 612. With this action using the movable switches 612a01 through 612a10, the recording sheet 6 can be pressed down reliably, thereby avoiding overrun of the recording sheet 6 on the second side fence 612 due to the curled end thereof.

Figure 28:
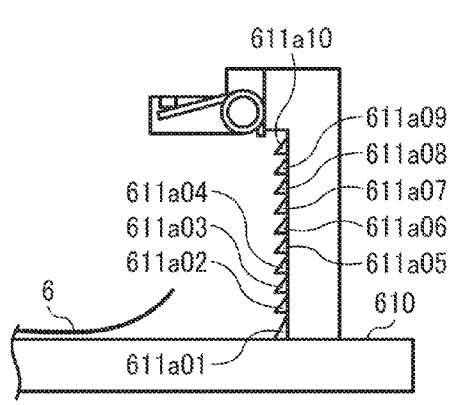
FIG. 28 is an enlarged front view illustrating the first side fence and the bottom plate included in the image forming apparatus according to the modification of the present invention.

Similarly, FIG. 28 is an enlarged front view illustrating the first side fence 611 and the bottom plate 610 of the image forming apparatus 1 according to the modification of the present invention.

Figure 29:
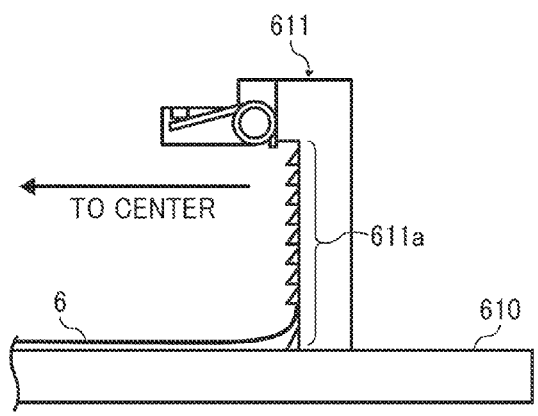
FIG. 29 is an enlarged front view illustrating a state in which the recording sheet contacts the first contact detector of the first side fence.

The first contact detector 611a of the first side fence 611 of FIG. 28 includes ten movable switches aligned in the sheet loading direction, specifically a first movable switch 611a01, a second movable switch 611a02, a third, movable switch 611a03, . . . a tenth movable switch 611a10. Each of the movable switches 611a01 through 611a10 can detect contact with the recording sheet 6 by moving individually. The movable switches 611a01 through 611a10 are located in the sheet loading direction closely. However, since each of the movable switches 611a01 through 611a10 includes a taper in a shape of a substantially right triangle, these movable switches 611a01 through 611a10 form an uneven surface in the sheet loading direction. Therefore, even if the recording sheet 6 has an excessively curled end, as the recording sheet 6 contacts the first side fence 611, the excessively curled end of the recording sheet 6 is caught at the convex portion, e.g., the lowest end of one of the movable switches 611a01 through 611a10, as illustrated in FIG. 29. Therefore, the recording sheet 6 is stopped at the portion, avoiding slippage on the side wall of the first side fence 611. With this action using the movable switches 611a01 through 611a10, the recording sheet 6 can be pressed down reliably, thereby avoiding overrun of the recording sheet 6 on the first side fence 611 due to the curled end thereof.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A sheet positioning device comprising:
a sheet setting plate to accommodate a sheet of recording medium set thereon;
a first regulating member disposed along one side of the sheet setting plate to move in an orthogonal direction perpendicular to a conveyance direction of the sheet, the first regulating member regulating a position of a first end of the sheet set on the sheet setting plate in the orthogonal direction by contacting the first end of the sheet in the orthogonal direction;
a second regulating member disposed opposite and facing the first regulating member along a second opposed side of the sheet setting plate to regulate a position of a second end of the sheet in the orthogonal direction by contacting the second end of the sheet in the orthogonal direction;
a driving mechanism to move at least the first regulating member in the orthogonal direction;
a first contact detector mounted on the first regulating member to detect that the first end of the sheet set on the sheet setting plate contacts thereto, the first contact detector including a first contact surface extending over an entire sheet loadable range in a sheet setting direction on the sheet setting plate to contact with the sheet;
a second contact detector mounted on the second regulating member to detect that the second end of the sheet set on the sheet setting plate contacts thereto, the second contact detector including a second contact surface extending over the entire sheet loadable range in the sheet setting direction on the sheet setting plate to contact with the sheet; and
a controller configured to stop the driving mechanism based on detection results obtained by the first contact detector and the second contact detector, and to cause the first regulating member and the second regulating member to adjust a position of the sheet set on the sheet setting plate in the orthogonal direction to a set position,
wherein the first contact detector includes a plurality of first detecting points to detect contact with the first end of the sheet at different heights from each other in the sheet setting direction,
wherein the second contact detector includes a plurality of second detecting points to detect contact with the second end of the sheet at different heights from each other in the sheet setting direction, and
wherein the controller causes the driving mechanism to stop driving based on detection results that indicate that a first sheet loadable height obtained by a detection result of the plurality of first detecting points of the first contact detector is equal to a second sheet loadable height obtained by a detection result of the plurality of second detecting points of the second contact detector, and that respective detecting points on the first contact detector and the second contact detector at the height of the top of the sheet contact and detect the sheet and different detecting points located below the respective detecting points contact and detect the sheet.

2. The sheet positioning device according to claim 1, wherein both the first contact detector and the second contact detector include multipoint pressure sensitive members.

3. The sheet positioning device according to claim 1,
wherein the first regulating member includes a first overhang disposed at a height equal to or above a sheet loadable range of the first regulating member and extending from a side wall of the first regulating member toward the second regulating member,
wherein the second regulating member includes a second overhang disposed at a height equal to or above a sheet loadable range of the second regulating member and extending from a side wall of the second regulating member toward the first regulating member.

4. The sheet positioning device according to claim 3,
wherein the first overhang of the first regulating member is rotatable about a shaft extending from the side wall of the first regulating member,
wherein the second overhang of the second regulating member is rotatable about a shaft extending from the side wall of the second regulating member.

5. The sheet positioning device according to claim 1,
wherein the first contact detector comprises a plurality of projections disposed on the side wall facing the first end of the sheet along the sheet loading direction,
wherein the second contact detector comprises a plurality of projections disposed on the side wall facing the second end of the sheet along the sheet loading direction.

6. A sheet holding receptacle comprising:
a sheet setting plate to receive at least one sheet thereon to adjust the at least one sheet to a set position; and
the sheet positioning device according to claim 1.

7. An image forming apparatus, comprising at least one of:
an image forming mechanism to feed a sheet and form an image on at least one surface of the sheet; and
an image reading mechanism to read an image formed on an original document sheet,
wherein the at least one of the image forming mechanism and the image reading mechanism includes the sheet positioning device according to claim 1.

* * * * *